United States Patent
Reay et al.

(10) Patent No.: US 7,032,051 B2
(45) Date of Patent: Apr. 18, 2006

(54) METHODS AND CIRCUITRY FOR INTERCONNECTING DATA AND CLOCK BUSSES OF LIVE BACKPLANE CIRCUITRY AND INPUT/OUTPUT CARD CIRCUITRY, AND METHODS AND CIRCUITRY FOR ISOLATING CAPACITANES OF A LIVE BACKPLANE FROM THE CAPACITANES OF AT LEAST ONE INPUT/OUTPUT CARD

(75) Inventors: Robert L. Reay, Milpitas, CA (US);
John H. Ziegler, Nashua, NH (US)

(73) Assignee: Linear Technology Corp., Milpitas, CA (US)

( * ) Notice: Subject to any disclaimer, the term of this patent is extended or adjusted under 35 U.S.C. 154(b) by 387 days.

(21) Appl. No.: 10/013,893

(22) Filed: Dec. 11, 2001

(65) Prior Publication Data
US 2002/0091887 A1    Jul. 11, 2002

Related U.S. Application Data

(60) Provisional application No. 60/254,821, filed on Dec. 11, 2000.

(51) Int. Cl.
G06F 13/00    (2006.01)

(52) U.S. Cl. ................ 710/301; 710/300; 710/302; 713/330

(58) Field of Classification Search ........ 710/300–306, 710/8–19, 2–3, 105, 106, 110, 310, 311, 313–317; 713/1–2, 330
See application file for complete search history.

(56) References Cited

U.S. PATENT DOCUMENTS 5,819,052 A * 10/1998 Sonoda ................. 710/113
5,822,547 A * 10/1998 Boesch et al. ............. 710/302
5,878,234 A *  3/1999 Dutkiewicz et al. ........ 710/110

(Continued)

FOREIGN PATENT DOCUMENTS

DE    3804074    8/1989

(Continued)

OTHER PUBLICATIONS

Data Sheet for Philips CBT 6800: "10-Bit Bus Switch With Precharged Outputs For Live Insertion," *Philips Semiconductors*, pp. 1-8, (Oct. 28, 1999).

(Continued)

*Primary Examiner*—Rehana Perveen
*Assistant Examiner*—Raymond N Phan
(74) *Attorney, Agent, or Firm*—Fish & Neave IP Group of Ropes & Gray LLP

(57) ABSTRACT

Circuits and methods for interconnecting a live backplane and at least one I/O card are provided. This invention provides interconnection circuitry that utilizes buffer circuitry to connect the data and clock busses of the backplane to the data and clock busses of the I/O card in a "hot-swappable" fashion. Buffer circuitry also isolates the capacitance associated with the backplane from the capacitance associated with the I/O card. For example, when at least one signal is driven from the backplane to the I/O card, the signal need only overcome the capacitance associate with the backplane. Conversely, when at least one signal is driven from the I/O card to the backplane, the signal need only overcome the capacitance associated with the I/O card. Hence, this capacitive isolation facilitates signal propagation between the backplane and the I/O card.

53 Claims, 10 Drawing Sheets

U.S. PATENT DOCUMENTS

| | | | | |
|---|---|---|---|---|
| 5,938,750 | A | * | 8/1999 | Shaberman ............... 710/301 |
| 5,983,298 | A | * | 11/1999 | Schultz et al. ............ 710/302 |
| 6,026,458 | A | * | 2/2000 | Rasums .................... 710/302 |
| 6,038,615 | A | * | 3/2000 | Yamada et al. .............. 710/2 |
| 6,047,343 | A | * | 4/2000 | Olarig ..................... 710/302 |
| 6,145,036 | A | * | 11/2000 | Barenys et al. ........... 710/300 |
| 6,212,586 | B1 | * | 4/2001 | Mros et al. ............... 710/302 |
| 6,438,625 | B1 | * | 8/2002 | Olson ......................... 710/9 |
| 6,487,623 | B1 | * | 11/2002 | Emerson et al. .......... 710/302 |
| 6,530,029 | B1 | * | 3/2003 | Metchev ................... 713/500 |
| 6,622,188 | B1 | * | 9/2003 | Goodwin et al. .......... 710/105 |
| 6,650,174 | B1 | * | 11/2003 | Bell .......................... 327/540 |
| 6,925,516 | B1 | * | 8/2005 | Struhsaker et al. ........ 710/301 |

FOREIGN PATENT DOCUMENTS

| | | |
|---|---|---|
| EP | 0 402 367 B1 | 12/1990 |
| EP | 0973261 A2 | 1/2000 |
| WO | WO 86/01658 | 3/1986 |
| WO | WO 98/22968 | 5/1998 |

OTHER PUBLICATIONS

"Method for Card 'Hot Plug' Detection and Control," *IBM Technical Disclosure Bulletin*, vol. 35, No. 5, pp. 391-394, (Oct. 1992).

Filliter et al., "Live Insertion Design Approaches," *National Semiconductor*, pp. 66-71, (Nov. 7, 1995).

Patent Abstract XP-002225435 of Korean Patent KR 9 405 776A, (Jun. 23, 1994).

"82B715 I$^2$C bus extender," *Philips Semiconductors*, Jan. 9, 1998, pp. 1-10.

Don Sherman, "Using the P82B715 I$^2$C bus extender on long cables," Jun. 1993, pp. 1-6.

"PCA9515 I$^2$C bus bridge," *Philips Semiconductors*, Mar. 7, 2001, pp. 1-9.

"PCI Hot Swap mit Einschalten innerhalb der Strombegrenzung," Linear Technlology Corporation, 1998, pp. 1-2.

* cited by examiner

METHODS AND CIRCUITRY FOR INTERCONNECTING DATA AND CLOCK BUSSES OF LIVE BACKPLANE CIRCUITRY AND INPUT/OUTPUT CARD CIRCUITRY, AND METHODS AND CIRCUITRY FOR ISOLATING CAPACITANES OF A LIVE BACKPLANE FROM THE CAPACITANES OF AT LEAST ONE INPUT/OUTPUT CARD

This application claims the benefit of U.S. Provisional Application No. 60/254,821, filed Dec. 11, 2000, the disclosure of which is hereby incorporated by reference herein in its entirety.

BACKGROUND OF THE INVENTION

This invention relates to interconnection circuitry. In particular, this invention relates to interconnecting I/O card busses with host system busses using interconnection circuitry.

Conventional systems, such as computers, servers, or other systems require I/O cards (e.g., control circuitry) to operate. I/O cards can monitor and control parameters such as voltage, current, and temperature to keep the system up and running. I/O cards typically operate at a much lower frequency than the processing and memory circuits of the system. Therefore, I/O cards may require a separate, slower clocking and data transfer scheme to operate. Accordingly, various specification standards have been developed to define methods for performing data transfer with these cards. $I^2C$ and SMBus specification standards, for example, define a two-wire bus system having a single data line (SDA) and a single clock line (SCL) used for serial data transfer.

As systems (e.g., server systems) have increased in size, the number of input/output (I/O) peripheral cards used in a system have also grown in proportion. As a result, the equivalent capacitance on the data (SDA) and clock (SCL) lines of two-wire bus systems has also increased. This is because the SDA and SCL lines of each I/O card connect directly to those on the system's backplane, resulting in a single large bus. The increased capacitance may present problems, making it difficult for designers to meet the rise and fall time requirements defined, for example, by the $I^2C$ and SMBus specifications.

Another problem that may occur relates to connecting and removing I/O cards from the backplane without having to power down the backplane (a procedure known as "hot swapping"). Typically, power supply lines and ground lines may be successfully hot swapped, but when other lines such as data and clock lines undergo hot-swapping, it may result in some sort of equipment or software failure, possibly even causing damage to the equipment.

It is therefore an object of the present invention to provide interconnection circuitry that can hot-swap data and clock lines of two interconnected devices.

It is also an object of the present invention to provide capacitive isolation among devices coupled together on a bus using interconnection circuitry.

SUMMARY OF THE INVENTION

In accordance with these and other objects of the invention, circuits and methods for interconnecting I/O cards and system backplanes are provided. In preferred embodiments of the invention, interconnection circuitry may utilize buffer circuitry to isolate the capacitances of the I/O cards from the capacitances of the system backplane. The buffer circuitry may implement various modifications of cross-coupled transistor arrangements to isolate (1) I/O cards from each other, (2) I/O cards from backplane, or (3) both.

One portion of the buffer circuitry may be used, for example, to drive signals from the system backplane to the I/O card. Then another portion of the buffer circuitry may be used to drive signals from the I/O card to the system backplane. Hence, the buffer circuitry provides bidirectional signal driving capabilities that isolate the capacitance of the busses connected to both sides of the interconnection circuitry. That is, the side of the interconnection circuitry coupled to the backplane is isolated from the side coupled to the I/O card.

The isolation of the respective capacitances may provide rapid LOW-to-HIGH and HIGH-to-LOW signal transitions. Since the capacitances of the I/O cards are isolated from each other and the backplane (and not combined), signals may only need to overcome the capacitance of the side that provides the signal. For example, if an I/O card is driving a signal to a backplane, the driving circuitry of the I/O card may have to overcome the I/O card capacitances, but need not address the backplane capacitances due to the isolation.

The present invention may also provide the capability to hot-swap systems using data and clock busses. Hot-swapping these system busses may be accomplished by connecting the backplane busses to the I/O card busses during a pre-determined condition. Preferably, the respective busses may be connected to each other when (1) a STOP bit or bus IDLE condition occurs on the backplane busses and when (2) the I/O card busses both exhibit HIGH signals. Connecting the busses together during this condition may ensure that busses are successfully connected and disconnected with the backplane without causing signal corruption or system failure.

The interconnection circuitry may have other circuitry such as under voltage lockout (UVLO) circuitry and pre-charge circuitry that assist the present invention in hot-swapping data and clock busses. UVLO circuitry ensures that the backplane and I/O card data busses and the backplane and I/O card clock busses are not coupled together if the voltage supplied to interconnection circuitry is below a predetermined voltage. For example, when the interconnection circuitry is initially powered up, the UVLO circuitry prevents the interconnection circuitry from monitoring the busses for the predetermined condition until there is sufficient voltage supplied to the circuit. Because the backplane and I/O card busses are not monitored in UVLO, the predetermined condition necessary for interconnection cannot be detected. In another example, when the supply voltage drops too low, the UVLO circuitry may force the coupled busses to disconnect and prevent monitoring of the busses.

Pre-charge circuitry may force a voltage on the backplane and I/O card busses prior to coupling the busses together. Applying this voltage to the respective busses before interconnection decreases the voltage differential that exists between the system backplane busses and the backplane pins located on the interconnection circuitry at the moment of connection. Minimizing the differential voltage seen at this interconnection also minimizes disturbance caused to the live system backplane.

BRIEF DESCRIPTION OF THE DRAWINGS

Further features of the invention, its nature and various advantages of the invention will be apparent upon consideration of the following detailed description, taken in conjunction with the accompanying drawings, in which like reference characters refer to like parts throughout, and in which.

DETAILED DESCRIPTION OF THE INVENTION

Circuits and methods for interconnection circuitry are provided. In particular, circuits and methods are provided for interfacing an I/O card with the backplane of a system using interconnection circuitry.

Figure 1:
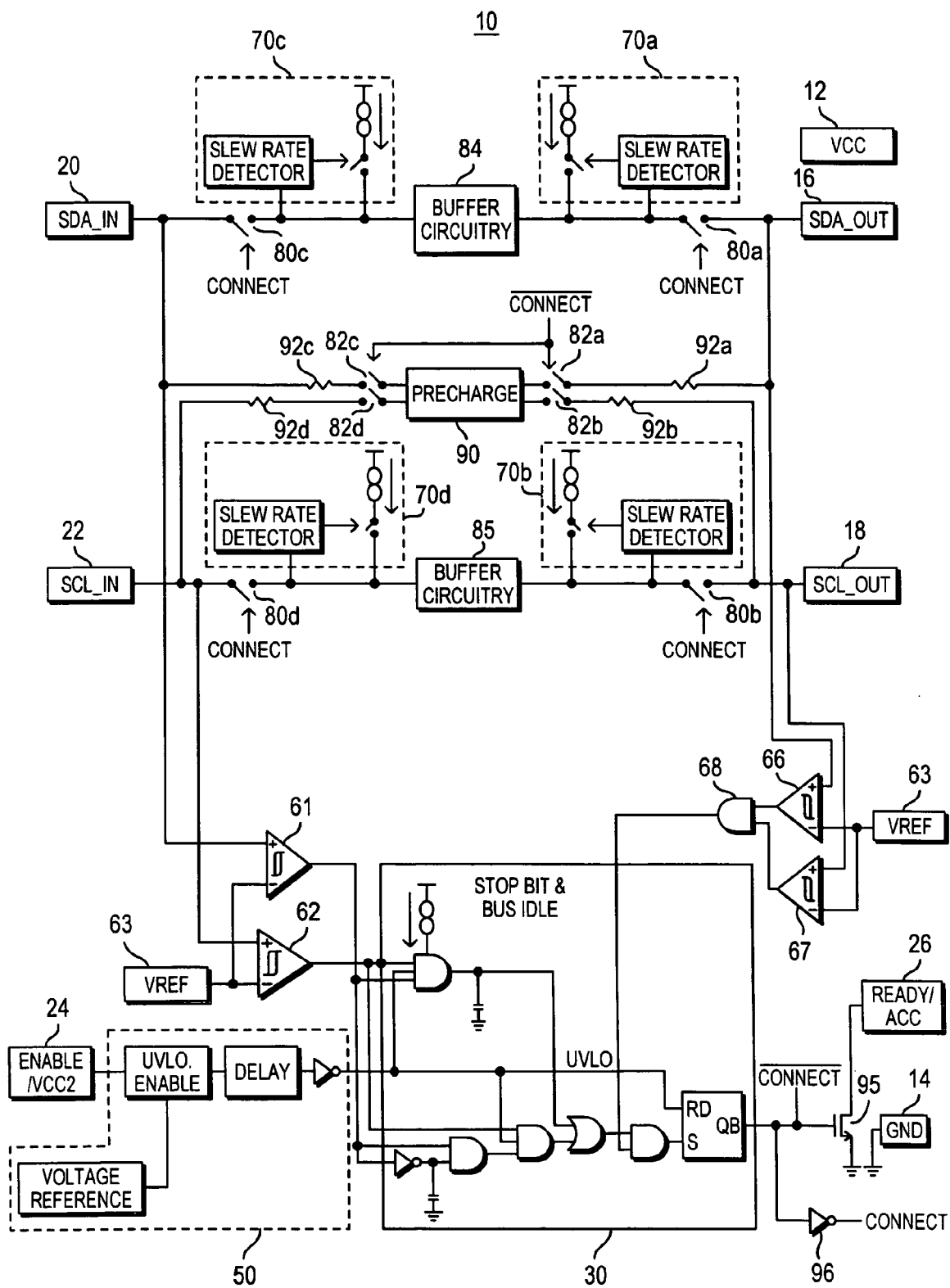
FIG. 1 is a pin out block diagram of interconnection circuitry according to the principles of the present invention.

FIG. 1 shows a pin out block diagram of interconnection circuitry 10 that addresses problems described above. Interconnection circuitry 10 may include VCC pin 12, GND pin 14, SDA_OUT pin 16, SCL_OUT pin 18, SDA_IN pin 20, SCL_IN pin 22, ENABLE/VCC2 pin 24, READY/ACC pin 26, STOP/IDLE circuitry 30, UVLO/ENABLE circuitry 50, comparators 61, 62, 66, and 67, AND gate 68, current boost circuitry 70a–d, switches 80a–d, switches 82a–d, buffer circuitry 84, buffer circuitry 85, pre-charge circuitry 90, resistors 92a–d, transistor 95, and inverter 96.

The above-mentioned circuitry can be connected as follows. SDA_OUT pin 16 can be coupled to buffer circuitry 84 via switch 80a. In addition, SDA_OUT pin 16 may also be coupled to pre-charge circuitry 90 via resistor 92a and switch 82a. SCL_OUT pin 18 may be coupled to buffer circuitry 85 via switch 80b, and also to comparator 67. In addition, SCL_OUT pin 18 may be coupled to pre-charge circuitry 90 via resistor 92b and switch 82b. SDA_IN pin 20 may be coupled to buffer circuitry 84 via switch 80c, and also to comparator 61. SDA_IN pin 20 may also be coupled to pre-charge circuitry 90 via resistor 92c and switch 82c. SCL_IN pin 22 may be coupled to buffer circuitry 85 via switch 80d. SCL_IN pin 22 may also be coupled to comparator 62, and to pre-charge circuitry 90 via resistor 92d and switch 82d. Comparators 61, 62, 66, and 67 may also be coupled to a reference voltage source 63, which can provide a voltage level at a ratio of VCC. In addition, current boost circuitry 70a–b may be coupled to both sides of buffer circuitry 84, while boost circuitry 70c–d may be coupled to buffer circuitry 85.

The output of comparators 66 and 67 may be coupled to AND gate 68. The output of AND gate 68 may be coupled to STOP/IDLE circuitry 30. Likewise, the outputs of comparators 61 and 62 may also be coupled to STOP/IDLE circuitry 30. ENABLE/VCC2 pin 24 may be coupled to UVLO/ENABLE circuitry 50, which can be coupled to STOP/IDLE circuitry 30. The output of STOP/IDLE circuitry 30 may be coupled to transistor 95, which is coupled to READY/ACC pin 26. The output of STOP/IDLE circuitry 30 may also be coupled to inverter 96.

Figure 2:
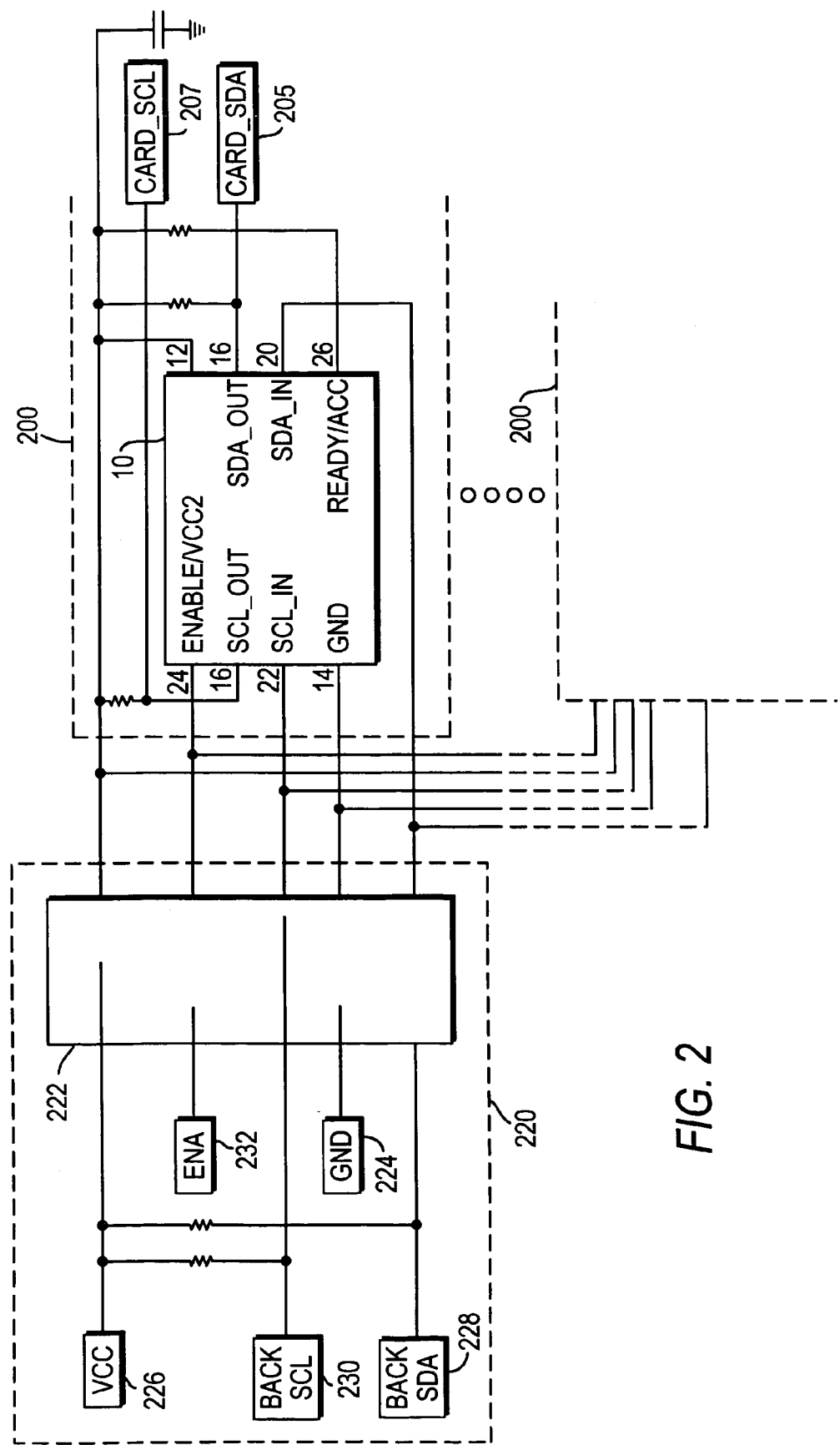
FIG. 2 is block diagram of the interconnection of a backplane and an I/O card according to the principles of the present invention.

Interconnection circuit 10 enables a user to hot-swap systems. Hot-swapping is a process in which a device such as an I/O card is inserted or removed from a "live" system (e.g., a server). Hence, hot-swapping facilitates interchangeability of systems without having to power down the respective host system. In accordance with the present invention, hot-swapping may be accomplished as follows. FIG. 2 provides an example in which interconnection circuitry 10 is utilized for hot-swap interconnection. In particular, FIG. 2 illustrates interconnection circuitry 10 being implemented on a system such as I/O card 200, which can be connected to a host system such as backplane 220.

FIG. 2 shows the SDA and SCL lines of backplane 220 and I/O card 200 connected to interconnection circuitry 10. FIG. 2 also shows that additional I/O cards can be coupled to backplane 220. When I/O card 200 is initially plugged into a live backplane 220 via connector 222, certain connections may occur in sequence (e.g., to provide hot-swap capacity). (Connector 222 may be a staggered connector, which, for example, interconnects the ground pin first and power pin second, before interconnecting the enable, data, and clock pins.) First, GND 14 is connected to GND 224 and then VCC 12 is connected to VCC 226. Then other pins such as SDA_IN 20, SCL_IN 22, and ENABLE/VCC2 24, may be connected to BACK_SDA 228, BACK_SCL 230, and ENA 232, respectively, at the substantially the same time. Persons skilled in the art will appreciate that various connection sequences can be implemented when I/O card 200 is interconnected with system backplane 222. For example, ENA 232 may be connected last to ensure that al of the other pins have established firm connections through connector 222 before any monitoring begins.

Hot-swapping VCC and GND is well known in the art and thus is not particularly pertinent to the present invention. Hot-swapping DATA and CLOCK busses, however, is germane to the present invention. As shown in FIG. 2, BACK_SDA bus 228 and BACK_SCL bus 230 of backplane 220 can be, respectively, hot-swapped with CARD_SDA bus 205 and CARD_SCL bus 207 of I/O card 200 via interconnection circuitry 10. Interconnection circuitry 10 provides this bus-to-bus hot-swap capability as follows.

Referring back to FIG. 1, assume that the ENABLE function of ENABLE/VCC2 24 is active and the VCC2 function is inactive. Also assume that the READY function of READY/ACC 26 is active and the ACC function is inactive. Interconnection circuitry 10 may not couple the backplane bus to the I/O card busses until: (1) the circuit is not operating in an under-voltage lockout (UVLO) condition; (2) when either a STOP bit or an IDLE condition exists for the backplane bus; (3) when each I/O card bus exhibits a HIGH signal; and (4) when a HIGH signal is applied to ENABLE/VCC2 24. UVLO may prevent interconnection circuitry 10 from operating (e.g., from coupling the backplane bus to any of the I/O card busses) until VCC 12 rises to a pre-determined voltage and the voltage on ENABLE/VCC2 24 is HIGH. Assuming that a logic HIGH signal is applied to ENABLE/VCC2 24, all activity on the backplane and I/O card busses is ignored until the voltage on VCC 12 rises to the predetermined voltage. A STOP bit or bus IDLE condition indicates that data transactions on the backplane busses are complete, and thus in condition to be connected to the I/O card busses.

UVLO/ENABLE circuitry 50 determines when the voltage on VCC pin 12 is at a predetermined value (e.g., 2.5 volts) and also determines when a logic HIGH is applied to ENABLE. Preferably, UVLO/ENABLE circuitry 50 is active substantially immediately after interconnection circuitry 10 receives power. Once active, UVLO/ENABLE circuitry 50 may send a HIGH signal to the RD input of a reset dominant flip-flop located in STOP/IDLE circuitry 30 (because the voltage on VCC pin 12 is below the predetermined value). (A reset dominant flip-flop forces the flip-flop output QB high whenever a HIGH signal is applied to its RD input. When RD is LOW, the S input of the flip-flop determines the state of QB.) Since a HIGH signal is provided to the RD input of the flip-flop, the QB output of the flip-flop is HIGH regardless of any signal applied to the S input of the flip-flop. This HIGH RD input signal causes interconnection circuitry 10 to ignore the signals on the backplane and I/O card busses.

The output of STOP/IDLE circuitry 30, CONNECT BAR, may control switches 82a–d, and its complement CONNECT may control switches 80a–d. For clarity, the output of STOP/IDLE circuitry 30 is represented by CONNECT BAR, and the output of inverter 96 is represented by CONNECT. As shown in FIG. 1, CONNECT BAR is associated with switches 82a–d and CONNECT is associated with switches 80a–d. CONNECT BAR and CONNECT are shown in FIG. 1 to illustrate the inverse relationship between switches 80a–d and 82a–d. That is, both sets of switches 80a–d and 82a–d cannot be in the closed position at the same time. For example, when QB is HIGH, switches 80a–d are OPEN, and switches 82a–d are CLOSED. Conversely, when QB is LOW, switches 80a–d are CLOSED, and switches 82a–d are OPEN.

The output of STOP/IDLE circuitry 30, as shown in FIG. 1, is coupled to transistor 95. In addition, READY/ACC pin 26 may be coupled to VCC pin 12 via a resistor. Transistor 95 may operate in conjunction with READY/ACC pin 26 to provide an indication of when the backplane bus is coupled to the I/O card busses. Thus when CONNECT BAR is HIGH, transistor 95 is active and the voltage at pin 26 is pulled low. When CONNECT BAR is LOW, VCC pin 12 pulls pin 26 up to VCC (e.g., READY is HIGH) via the resistor. This HIGH READY signal may indicate to a user that the backplane and I/O card busses are interconnected, perhaps by activating a light emitting diode (LED) located on the I/O card.

During UVLO, the output of STOP/IDLE circuitry 30 is HIGH and thus causes switches 82a–d to CLOSE. When switches 82a–d are CLOSED, pre-charge circuitry 90 forces a voltage (e.g., 1 volt) on SDA_OUT pin 16, SCL_OUT pin 18, SDA_IN pin 20, and SCL_IN pin 22 through four resistors 92a–d that are coupled between each of the pins and pre-charge circuitry 90. Resistors 92a–d may each have a resistance substantial enough (e.g., 100K Ohm) to buffer pre-charge circuitry 90 from SDA_OUT pin 16, SCL_OUT pin 18, SDA_IN pin 20, and SCL_IN pin 22.

Because the I/O card is being plugged into a live backplane, the voltage on the SDA and SCL backplane busses may be anywhere between OV and VCC. Pre-charging SCL_IN pin 20 and SDA_IN pin 22 minimizes the voltage differential that these pins see at the moment of interconnection with the system backplane busses. Minimizing the differential voltage also minimizes disturbance caused to the live system backplane. SDA_OUT pin 16 and SCL_OUT pin 18 may also be charged by pre-charge circuitry 90 just in case a user were to attempt to connect these pins to the live system backplane busses.

Pre-charge circuitry may force a voltage on the backplane and I/O card busses prior to coupling the busses together. Applying this voltage to the respective busses before interconnection decreases the voltage differential that exists between the system backplane busses and the backplane pins on the interconnection circuitry at the moment of connection.

When interconnection circuitry 10 is supplied with enough voltage, (e.g., VCC pin 12 voltage is greater than or equal to 2.5V) and ENABLE is HIGH, the circuit may no longer operate in UVLO. That is, when interconnection circuitry 10 is not in UVLO, UVLO/ENABLE circuitry 50 provides a LOW signal to the RD input of the flip-flop in STOP/IDLE circuitry 30. This enables STOP/IDLE circuitry 30 to begin monitoring the SDA and SCL busses on the backplane and the I/O card. When STOP/IDLE circuitry 30 monitors a STOP bit or bus IDLE condition on the backplane busses and HIGH signals on the I/O card busses, it may cause switches 80a–d to close and switches 82a–d to open. Once switches 80a–d are CLOSED, the busses on the backplane and I/O card are interconnected via buffer circuitry 84 and 85.

STOP/IDLE circuitry 30 may be able to determine when to close switches 80a–d based the outputs provided by comparators 61, 62, 66, and 67. Comparators 61, 62, 66, and 67 monitor the voltages on the backplane and I/O busses. In particular, comparators 61 and 62 monitor the voltages on SDA_IN pin 20 and SCL_IN pin 22, respectively. Comparators 66 and 67 monitor the voltages on SDA_OUT pin 16 and SCL_OUT pin 18, respectively. Comparators 61, 62, 66, and 67 can be, for example, hysteretic comparators, but other suitable types of comparators can be used as well.

An advantage of hysteretic comparators is that they may provide noise immunity to various signals provided by the systems. Noise immunity may be achieved by relying on two separate threshold voltages to determine when the comparator provides a particular output signal. For example, if the amplifier input voltage is originally LOW, it may have to rise to a first threshold voltage (e.g., about 55% of VCC) before a HIGH output signal is provided by the comparator. If the amplifier input voltage is HIGH, it may have to fall to a second threshold voltage (e.g., about 45% of VCC) before a LOW output signal is provided by the amplifier. Persons skilled in the art will appreciate that any suitable threshold voltages can be implemented with hysteretic comparators. For example, the LOW threshold level and HIGH threshold level may be 30% and 70% of VCC, respectively.

STOP/IDLE circuitry 30 may determine when a STOP bit or bus IDLE condition exists based on the outputs provided by hysteretic comparators 61 and 62. A STOP bit or bus IDLE condition indicates that data transactions on the backplane bus are complete. Hence if data transactions on the backplane bus are inactive or complete, the backplane bus may be in condition to connect to I/O card busses. A STOP bit condition occurs when SDA_IN transitions HIGH while SCL_IN is HIGH. A bus IDLE condition occurs, in accordance with I²C and SMBus specifications, when both SDA_IN and SCL_IN are HIGH for at least 50 µs. While the present invention has been constructed in accordance with the current standards of the I²C and SMBus specifications; persons skilled in the art will appreciate that those standards may vary depending on bus speed and other factors.

STOP/IDLE circuitry 30 also verifies that both the SDA_OUT and SCL_OUT voltages are HIGH before closing switches 80*a–d*. When the voltages at the SDA_OUT pin 16 and SCL_OUT pin 18 are HIGH, the output voltages of comparators 67 and 68 go HIGH. When SDA_OUT pin 16 and SCL_OUT pin 18 are HIGH, and either a STOP bit or a bus IDLE condition occurs on SDA_IN pin 20 and SCL_IN pin 22, the S input of the latch goes HIGH forcing QB LOW, if RD is already LOW.

Once STOP/IDLE circuitry 30 causes switches 80*a–d* to CLOSE, switches 80*a–d* may remain CLOSED until either (1) ENABLE goes LOW or (2) the voltage on VCC pin 12 drops below the predetermined value. Assume, for example, that switches 80*a–d* are closed, but the voltage on VCC pin 12 drops below the predetermined voltage level. If this occurs, UVLO circuitry may force interconnection circuitry 10 into UVLO by providing a HIGH signal to the RD input of the flip-flop in STOP/IDLE circuitry 30. Thus, this causes switches 80*a–d* to OPEN and switches 82*a–d* to CLOSE, and the process in determining when to couple the backplane and I/O card busses as described above is reinitiated.

When QB goes LOW, switches 80*a–d* close in response to CONNECT BAR being a LOW signal. When switches 80*a* and 80*c* close, SDA_IN pin 20 is coupled to the SDA_OUT pin 16 through buffer circuitry 84. SCL_IN pin 22 is coupled to SCL_OUT pin 18 through buffer circuitry 85 when switches 80*b* and 80*d* close. Also, when QB goes LOW, switches 82*a–d* open to decouple pre-charge circuitry 90 from SDA_OUT pin 16, SDA_IN pin 20, SCL_OUT pin 18, and SCL_IN pin 22.

Preferably, buffer circuitry 84 is used in conjunction with switches 80*a–d* to provide hot-swap capability to the busses. However in an alternative embodiment, as shown in FIG. 3, switches 80*a–d* may be removed, and the SDA and SCL busses on the backplane and the I/O card can be coupled and decoupled by enabling and disabling the bias currents in amplifiers AMP1 and AMP2.

Once the backplane and I/O card busses are interconnected, buffer circuitry 84 and 85 (FIG. 1) provide interconnection circuitry 10 with the ability to drive signals between the backplane and I/O cards. FIG. 3 illustrates one example of the buffer circuitry of FIG. 1 constructed in accordance with the principles of the present invention.

In this example, the buffer circuitry is generically indicated by box 100 and includes amplifiers AMP1 and AMP2, voltage sources 105 and 108, and transistors 106 and 109. In FIG. 3, buffer circuitry 84 is illustrated with VCC, GND, SDA_IN pin 20, SDA_OUT pin 16, RBACK, CBACK, external device NE1, external device NE2, RCARD, and CCARD. The devices illustrated outside box 100 may be provided to show how buffer circuitry 84 interacts with other elements of interconnection circuitry 10. For example, VCC may represent the voltage provided to both the backplane and I/O card. RBACK may represent an arbitrary value of resistance existing between VCC and SDA_IN 20. CBACK may represent the capacitance associated with SDA_IN 20 and the backplane. NE1 may be a simple representation of the backplane and is shown to illustrate how the backplane applies signals to SDA_IN 20. Similarly, RCARD, CCARD, and NE2 are respectively associated with SDA_OUT 16 and the I/O card.

Figure 3:
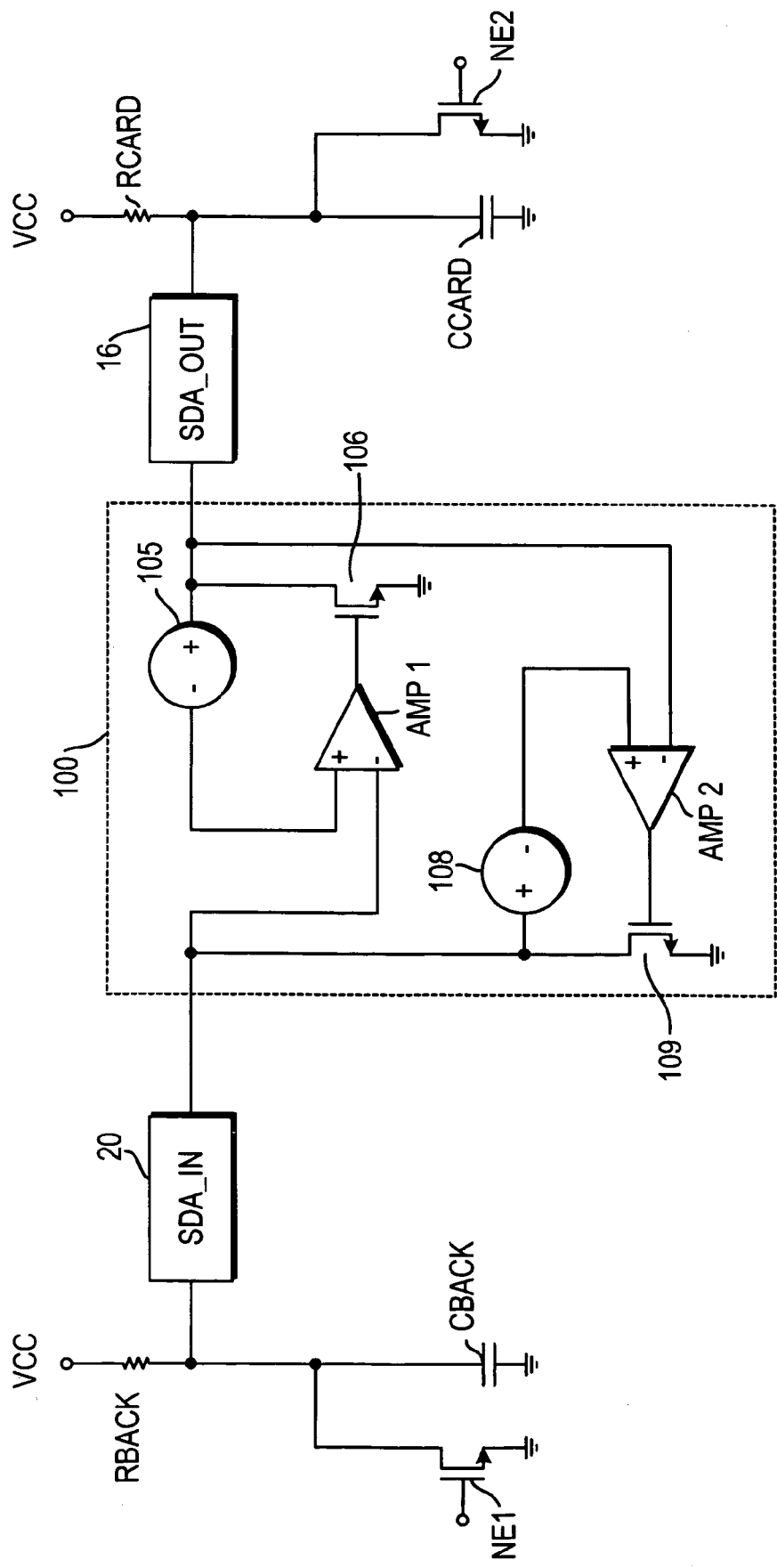
FIG. 3 is a circuit diagram of buffer circuitry according to the principles of the present invention.

Persons skilled in the art will appreciate that FIG. 3 may also represent the circuitry provided in buffer circuitry 85 in addition to, or instead of buffer circuitry 84. For instance, buffer circuitry 100 could be configured to interconnect SCL_IN 22 and SCL_OUT 18. For purposes of providing clarity and brevity, elements such as VCC, REACK, CBACK, RCARD, CCARD, NE1, and NE2 may be illustrated in other figures (e.g., FIGS. 5, 8, 9, and 10). These elements may inherently represent the same attributes and functionality as those elements described in FIG. 3.

RBACK is coupled to SDA_IN pin 20, VCC, CBACK, and NE1. SDA_IN pin 20 is coupled to external device NE1, CBACK, amplifier AMP1, transistor 109, and voltage source 108. The output of amplifier AMP1 is coupled to transistor 106. SDA_OUT pin 16 is coupled to voltage source 105, transistor 106, amplifier AMP2, RCARD, CCARD, and external device NE2. Voltage sources 105 and 108 are coupled to the non-inverting input of amplifiers AMP1 and AMP2, respectively. RCARD is coupled to VCC, CCARD, SDA_OUT 16, and NE2. CBACK, CCARD, transistors 106 and 109, and devices NE1 and NE2 are coupled to ground.

Capacitors CBACK and CCARD shown in FIG. 3 may represent the equivalent capacitance on the SDA busses at SDA_IN pin 20 and SDA_OUT pin 16, respectively. Capacitors CBACK and CCARD may also represent the equivalent capacitance on the SCL busses coupled to buffer circuitry 85 (such as shown in FIG. 1) coupled between those respective pins. One advantage of the present invention is that the buffer circuitry 100 isolates the capacitance of the backplane (e.g., CBACK) from the capacitance of the I/O card (e.g., CCARD). Buffer circuitry 100 is able to maintain capacitive isolation while being able to transfer signals between the backplane and the I/O card.

Buffer circuitry 100 may be able to drive signals from one device to another using the cross-coupled amplifier arrangement of the present invention. For example, amplifier AMP1 may drive signals provided by the backplane bus to the I/O card bus by forcing SDA_OUT pin 16 to mimic the signal received at SDA_IN pin 20. (This can be accomplished because amplifier AMP1 operates similar to that of a voltage follower. For example, when SDA_IN goes low, AMP1 causes SDA_OUT to go low). Thus amplifier AMP1 can relay signals from the backplane bus to the I/O card bus, while isolating them from each other. Likewise, amplifier AMP2 can relay signals from the I/O card bus to the backplane bus.

When external device NE1 pulls down SDA_IN pin 20, amplifier AMP1 turns ON transistor 106. When transistor 106 is activated, the voltage on SDA_OUT pin 16 may be forced to follow the voltage provided on SDA_IN pin 20. However, voltage source 105 may regulate the voltage on SDA_OUT pin 16 to a predetermined voltage (e.g., 50 mV) above the SDA_IN pin 20 voltage when transistor 106 is active.

Likewise, when external device NE2 pulls down SDA_OUT pin 16, amplifier AMP2 turns ON transistor 109. Once transistor 109 is activated, the voltage on SDA_IN pin 20 may be driven down to a predetermined voltage above the voltage provided on SDA_OUT pin 16. Voltage source 108 may provide the predetermined voltage that regulates the voltage of SDA_IN pin 20 above that of SDA_OUT pin 16. Thus, amplifiers AMP1 and AMP2 provide buffer circuitry 100 with bi-directional signal swapping capability.

Voltage sources 105 and 108 may be coupled to amplifiers AMP1 and AMP2, respectively, to prevent amplifiers AMP1 and AMP2 from turning ON at the same time. If AMP1 and AMP2 turn ON at the same time, buffer circuitry 100 may latch itself in a permanent LOW state. In practice, amplifiers usually exhibit a random offset voltage caused by imperfect construction of various components (e.g., differential amplifier) of the amplifier. If this offset voltage is too HIGH, the amplifier may not respond accurately to the signals applied to its input.

For example, assume voltage source 105 and 108 are both zero volts, and that AMP1 has a random offset of zero volts. If NE1 turns ON and pulls SDA_IN 20 to zero volts, then AMP1 turns ON transistor 106 and forces SDA_OUT 16 to zero volts. Next, assume that AMP2 has a random offset such that it regulates the voltage on SDA_IN 20 at 10 mV below that of the voltage on SDA_OUT 16. Since the voltages on SDA_IN 20 and SDA_OUT 16 are both zero, AMP2 turns ON transistor 109 in an attempt to pull the voltage on SDA_IN 20 below ground. Now, transistors 106 and 109 are both ON, and when NE1 turns OFF, the voltages on both SDA_IN 20 and SDA_OUT 16 remain LOW.

The rising waveforms occur as follows. When the backplane stops applying a low signal to SDA_IN (e.g., deactivates NE1), the voltage on SDA_IN 20 is pulled up to VCC. Assume that in this example that the voltage pins 16 an 20 rise at the same rate. As the voltage rises on SDA_IN 20, the voltage on SDA_OUT 16 may also rise, but is held at the predetermined voltage above that on SDA_IN 20. For example, assume that SDA_IN 20 has been pulled down to about zero volts. The voltage on SDA_OUT 16 may be at the predetermined voltage, which can be 50 mV. When the voltage on SDA_IN 20 rises to 2.0V, the voltage on SDA_OUT 16 may be 2.05V. SDA_OUT 16 may then track SDA_IN 20 at 50 mV above SDA_IN 20 until SDA_OUT 16 reaches VCC. The above example assumed that the voltage on both pins rise at the same rate. The following example describes how buffer circuitry 100 operates when the rise rate differs for each respective pin.

Once external device NE1 stops pulling down SDA_IN pin 20, SDA_IN pin 20 is pulled HIGH to VCC through RBACK and SDA_OUT pin 16 is pulled HIGH to VCC through RCARD. The voltage on pins 16 and 20 may independently rise in accordance with the time constants provided by RCARD*CCARD and RBACK*CBACK, respectively, however, the voltage rise rate for both pins is determined by the slower of the respective time constants. The rise rate for both pins 16 and 20 is tied to the slower rate because voltage sources 105 and 108 regulate the voltage differential of pins 16 and 20 within a predetermined voltage level.

For example, assume that voltage sources 105 and 108 provide 50 mV and that SDA_OUT pin 16 has a faster rise rate than SDA_IN pin 20. If SDA_OUT pin 16 rises to a voltage 50 mV higher than SDA_IN pin 20, AMP1 will turn ON and continuously regulate the voltage on SDA_OUT pin 16 to a voltage 50 mV above that on SDA_IN pin 20 as both voltages rise. The voltage regulation forces the voltage on SDA_IN pin 16 to rise at near the same rise rate as SDA_pin 20. Likewise, if SDA_IN pin 20 has a faster voltage rise rate than SDA_OUT pin 16, AMP2 will begin to regulate SDA_IN pin 20 when the voltage differential exceeds 50 mV. Once active, AMP2 will regulate the voltage on SDA_IN pin 20 to a voltage 50 mV above that of SDA_OUT pin 16 as they both voltages rise.

The voltages on both SDA_IN pin 20 and SDA_OUT pin 16 should rise as a substantially uniform edge when the external devices (e.g., either external devices NE1 or NE2) are deactivated. Since the capacitances and resistances associated with the backplane and the I/O card can be significantly different, and since the amplifiers cannot respond instantaneously to voltage changes on SDA_IN 20 and SDA_OUT 16, the voltages on SDA_IN 20 and SDA_OUT 16 may not rise uniformly as a function of time. For this reason amplifiers AMP1 and AMP2 should only be active during the falling edges on the SDA_IN and SDA_OUT busses, or when these two busses are at LOW voltages.

Otherwise, if amplifiers AMP1 and AMP2 are active during a rising edge, the pin (e.g., either SDA_IN or SDA_OUT) whose voltage is rising more slowly may erroneously turn ON one of the amplifiers. By activating this amplifier, the slow rising pin may drive the fast rising pin down to the pre-determined voltage (e.g., 50 mv) higher than its own (because the amplifier turns on the transistor which couples the pin to ground). When this occurs, the voltage on the faster rising pin may switch from rising to falling and back to rising again. This adverse effect is illustrated in the graph of SDA_IN waveform shown in FIG. 4.

Figure 4:
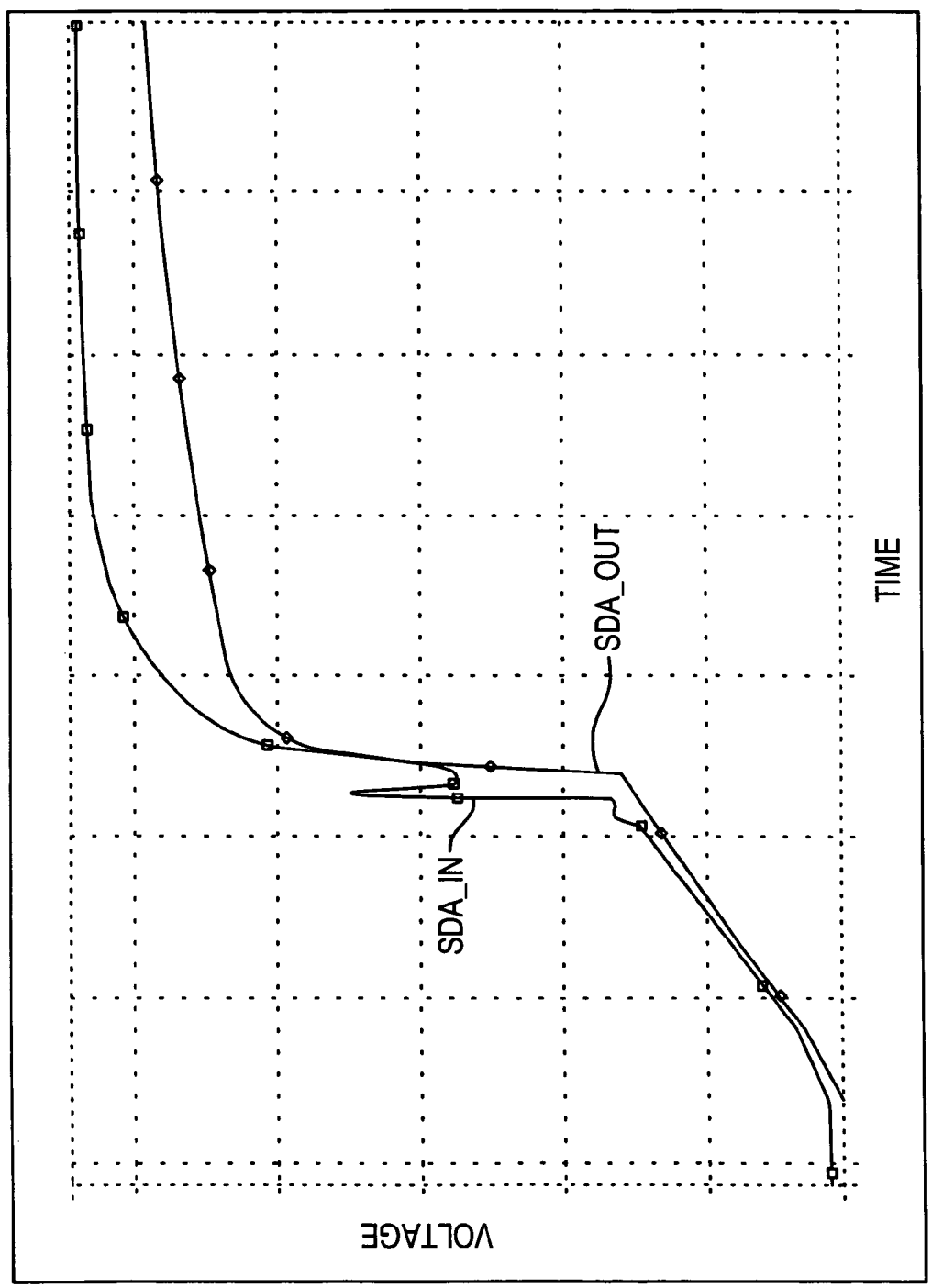
FIG. 4 shows illustrative waveform diagrams provided by using the circuit diagram of FIG. 3 according to the principles of the present invention.

FIG. 4 shows an SDA_IN waveform that undergoes an erroneous rising-to-falling transition because it is rising faster than the SDA_OUT waveform. Therefore, amplifier AMP2 may temporarily activate transistor 109 to drive the SDA_IN voltage within the pre-determined voltage above that of SDA_OUT. Then, once SDA_IN is within the predetermined voltage of SDA_OUT, SDA_IN may transition back to rising, as is illustrated. Voltage transitions during rise time are undesirable because they may cause glitches in data transfer or other undesired effects.

Figure 5:
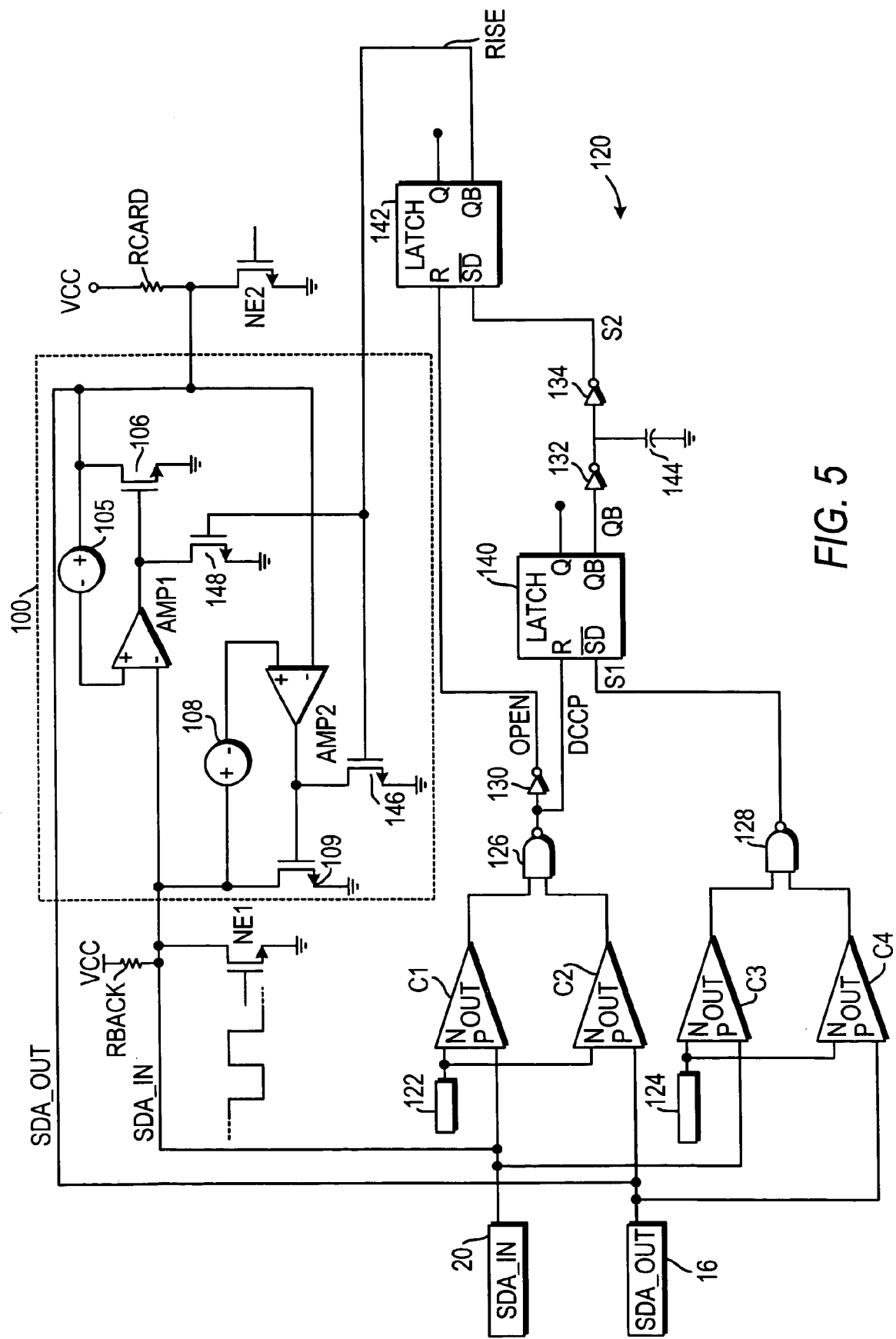
FIG. 5 is a circuit diagram of buffer circuitry of FIG. 3 being used in conjunction with buffer control circuitry according to the principles of the present invention.

FIG. 5 shows one example of digital control circuitry 120 that may be implemented to resolve the above problem illustrated by FIG. 4. Digital control circuitry 120 may be implemented to disable amplifiers AMP1 and AMP2 during rise time on SDA_IN pin 20 and SDA_OUT pin 16 to prevent undesired voltage transitioning. Such a configuration can be implemented using buffer circuitry 100, reference voltage sources 122 and 124, comparators C1, C2, C3, and C4, NAND gates 126 and 128, inverters 130, 132, and 134, latches 140 and 142, and capacitor 144. In addition, transistors 146 and 148 may be added to buffer circuitry 100 to provide digital control circuitry 120 with the ability to shut down amplifiers AMP1 and AMP2 during rise time. The various components of control circuitry 120 may be organized as follows.

SDA_IN pin 20 may be coupled to comparators C1 and C3, but preferably to the non-inverting inputs of each comparator. SDA_OUT pin 16 may be coupled to comparators C2 and C4, but preferably to the non-inverting inputs of those comparators. Reference voltage source 122 may be coupled to comparators C1 and C2, but preferably to the inverting inputs of those comparators. Reference voltage source 124 may be coupled to comparators C3 and C4, but preferably to the inverting inputs of those comparators. The outputs of comparators C1, C2, C3, and C4 may be HIGH when the non-inverting input is higher than the inverting input. Conversely, the comparator outputs may be LOW when the voltage on the non-inverting input is lower than the voltage on the inverting input.

The outputs of comparators C1 and C2 may be coupled to NAND gate 126, while the outputs of comparators C3 and C4 may be coupled to NAND gate 128. The output of NAND gate 126, signal DCCP, can be coupled to inverter 130 and latch 140. While DCCP is shown coupled to the R input of the SET dominant latch 140, persons skilled in the art will appreciate that other latch configurations may be used without departing from the spirit of the problem. Inverter 130 may have an output, signal OPEN, coupled to latch 142. The output of NAND gate 128, signal S1, may be coupled to latch 140. S1 may be coupled to the SDBAR pin of latch 140, but as described above, other latch configurations may be implemented as well. Both latches 140 and 142 are shown as SET dominant latches which operate as follows. Whenever the voltage on the SDBAR input is LOW, the voltage on the QB output is LOW, regardless of the voltage on the R input. When the voltage on SDBAR goes HIGH, the voltage on QB remains LOW if the voltage on the R input is LOW. Once the R input goes HIGH, QB goes HIGH and remains HIGH until SDBAR goes LOW again.

Latch 140 may have an output, signal QB, coupled to inverter 132. Inverter 132 may have an output coupled to inverter 134, with capacitor 144 being coupled between inverters 132 and 134. The combination of inverters 132 and 134, and capacitor 144 provide a delay between QB going HIGH and S2 going HIGH. This delay may be necessary to prevent a substantially instantaneous application of QB to the input of latch 142. The output of inverter 134, signal S2, may be preferably coupled to the SDBAR input of SET dominant latch 142. Latch 142 may have an output, RISE, coupled to both transistors 146 and 148. The operation of control circuitry 120 over one complete switching cycle is discussed next.

This example assumes, initially, that the voltages on SDA_IN pin 20 and SDA_OUT pin 16 are HIGH. When the voltages on SDA_IN and SDA_OUT are both HIGH (e.g., VCC), the outputs of all four comparators are HIGH. Since each of the comparator outputs are HIGH, the output of NAND gates 126 and 128 are LOW. Therefore, nodes DCCP and S1 are both LOW, and node OPEN is HIGH. With S1 LOW, signals QB of latch 140 and S2 are also LOW. A LOW S2 may cause signal RISE (i.e., the QB output of latch 142) to be LOW, which results in turning transistors 146 and 148 OFF.

When device NE1 turns ON, the voltage on SDA_IN pin 20 may begin to decline. Once it falls below reference voltage 124 (e.g., about VCC −0.6V), the output of comparator C3 may go LOW, which forces S1 HIGH. However, since DCCP is still LOW, QB of latch 140, S2, and RISE stay LOW. Since RISE is LOW, AMP1 and AMP2 are not disabled, and thus may drive transistors 106 and 109, respectively. When the voltage on SDA_IN pin 20 starts falling, AMP1 turns ON and pulls the SDA_OUT pin 16 voltage down.

When device NE1 pulls down on SDA_IN pin 20, the voltage may eventually fall below reference voltage 122 (e.g., about 0.6V). When the voltage on SDA_IN pin 20 drops below this threshold voltage, the output of comparator C1 may go LOW. This may force DCCP HIGH and OPEN LOW. When DCCP is HIGH and S1 is still HIGH, QB of latch 140 goes HIGH. Thus S2 is also HIGH and is applied to latch 142. The OPEN signal, which is LOW, is also applied to latch 142. Hence, latch 142 is "primed" for OPEN to go HIGH again, which will cause RISE to go HIGH. As the voltage on SDA_IN pin 20 falls, the voltage on SDA_OUT pin 16 may also fall below reference voltage 122. When SDA_OUT pin 16 falls below reference voltage 122, comparator C2 may provide a LOW output voltage to NAND gate 126. The LOW output voltage provided by comparator C2, however, may not change the state of any of the signals provided in control circuitry 120.

When the voltage falls on SDA_IN or SDA_OUT (or the SCL pins as is appropriate), the RISE signal (i.e., signal that enables or disables transistors 146 and 148) should remain LOW. In order to satisfy this requirement, the R input to latch 142 (i.e., signal OPEN) should go LOW before the SD input (i.e., signal S2) goes HIGH. If this condition is not met, then transistors 146 and 148 may be prematurely enabled. However, the delay provided by inverters 132 and 134 and capacitor 144 helps to prevent this from occurring. In particular, the delay ensures that OPEN is applied to latch 142 before S2 is applied to latch 142. As a result, the RISE signal is HIGH only when voltages are rising on SDA_IN pin 20 and SDA_OUT pin 16.

When device NE1 turns OFF, VCC starts to pull SDA_IN pin 20 HIGH via RBACK, and AMP1, in conjunction with RCARD, drives the voltage on SDA_OUT pin 16 higher as the voltage on SDA_IN pin 20 rises. When the voltages on SDA_IN pin 20 and SDA_OUT pin 16 both rise above reference voltage 122 (e.g., 0.6V), the outputs of both comparators C1 and C2 go HIGH. The high voltage outputs provided by comparators C1 and C2 may cause DCCP to go LOW and OPEN to go HIGH. With DCCP LOW and S HIGH, QB and S2 remain HIGH. Since S2 remains HIGH, RISE goes HIGH when OPEN goes HIGH. When RISE is HIGH, transistors 146 and 148 are activated. Once transistors 146 and 148 conduct to set the output of AMP2 and AMP1 to ground, thereby disabling transistors 109 and 106, respectively. Once transistors 106 and 109 are disabled, VCC may pull up SDA_IN pin 20 and SDA_OUT pin 16 via RBACK and RCARD, respectively. Optional boost current circuitry 70 (shown in FIG. 1 and discussed below) can also be activated to help pullup both SDA_IN pin 20 and SDA_OUT pin 16.

Once the voltages on SDA_IN pin 20 and SDA_OUT pin 16 both rise above reference voltage 124 (e.g., VCC −0.6V), the outputs of comparators C3 and C4 both go HIGH. This may force S1 LOW. With S1 LOW, QB of latch 140, S2, and RISE may all go LOW, thus turning OFF transistors 146 and 148. When transistors 146 and 148 are OFF, transistors 106 and 109 are enabled in that amplifiers AMP1 and AMP2 are able to turn them ON and OFF. Once amplifiers AMP1 and AMP2 are provided with the ability to drive their respective transistors (i.e., their outputs are not grounded), digital control circuitry 120 is reinitialized for another switching cycle.

Figure 6:
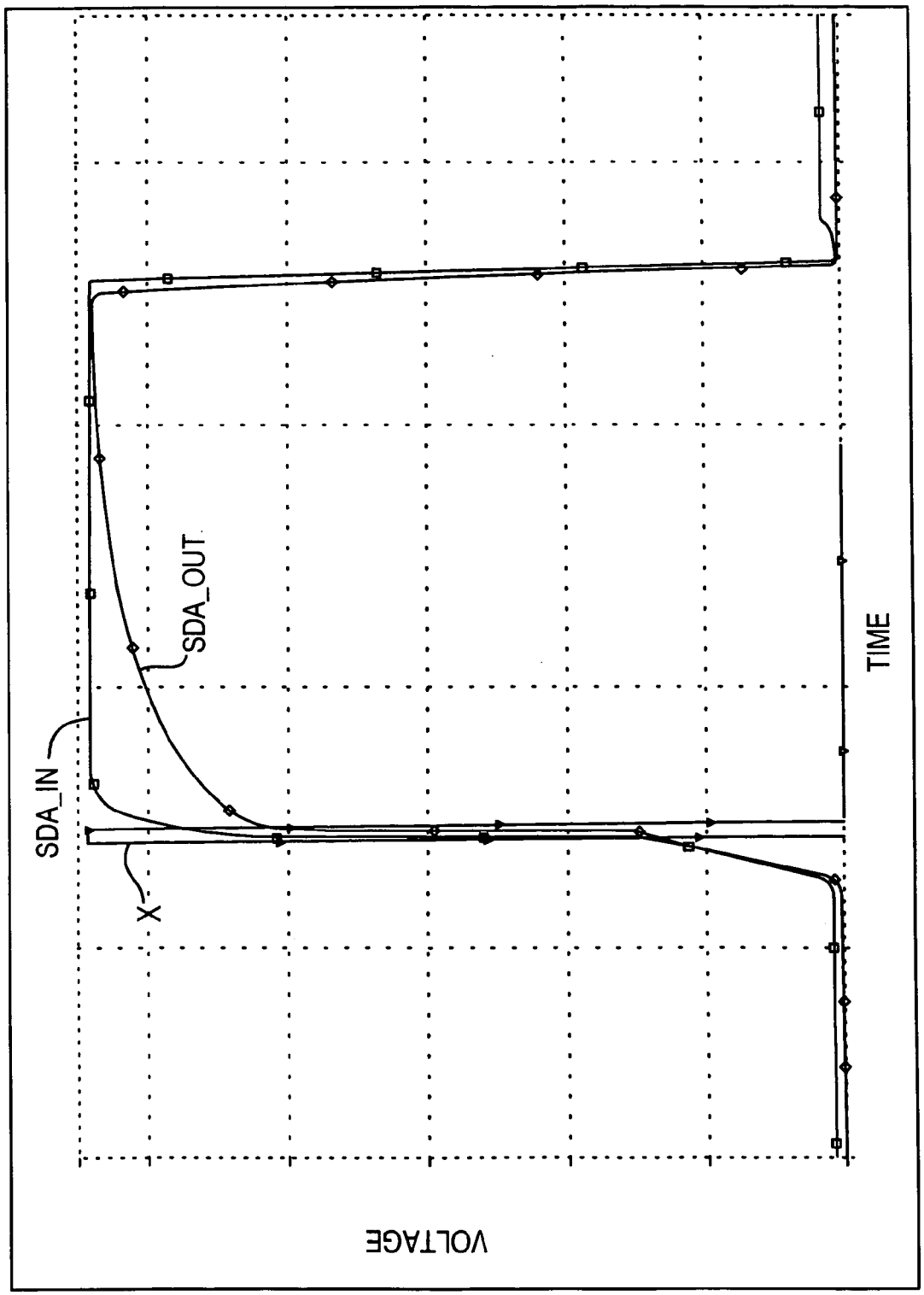
FIG. 6 shows illustrative waveform diagrams provided by using the circuit diagram of FIG. 5 according to the principles of the present invention.
Figure 7:
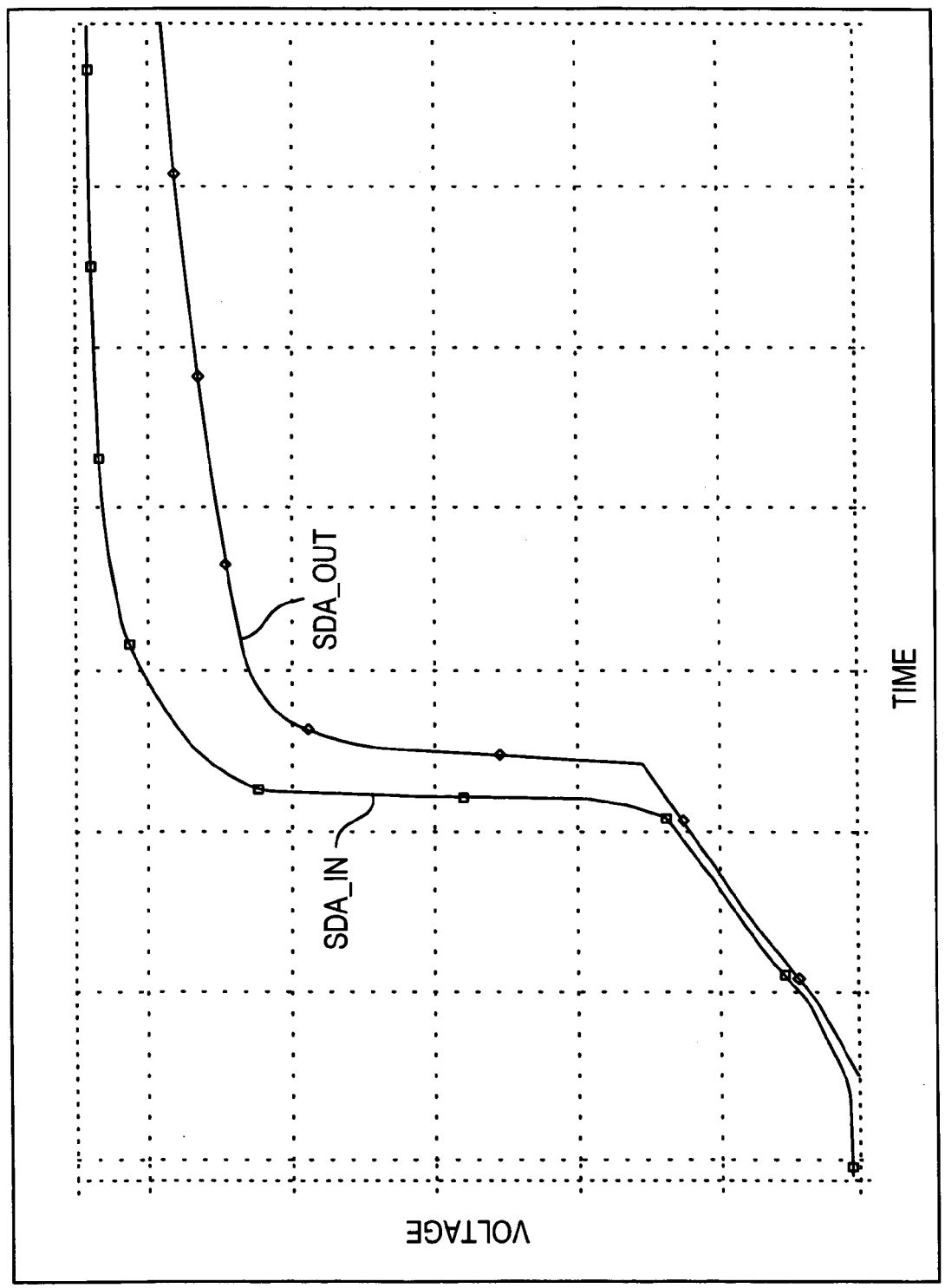
FIG. 7 shows detailed illustrative waveform diagrams from a portion of FIG. 6 according to the principles of the present invention.

FIG. 6 illustrates a complete switching cycle of the voltage on SDA_IN pin 20 and SDA_OUT pin 16 when operating in conjunction with digital control circuitry 120. FIG. 6 also shows a waveform, X, of the gate voltage applied to transistors 146 and 148. When X is HIGH, AMP1 and AMP2 are deactivated. FIG. 7 illustrates rising edge waveforms of SDA_IN pin 20 and SDA_OUT pin 16. As shown, both rising edge waveforms exhibit a substantially continuous rising edge that is free from the undesired transitions shown in FIG. 4.

When the I/O card is connected to the backplane, signals may then be transferred therebetween. Since it is desirable to transfer signals quickly from one device to another, the present invention may speed up signal transfer by assisting the rise time transitions from OFF to ON. Current boost circuitry 70a–d, as shown in FIG. 1, may decrease the rise time transition of voltages on SDA_OUT pin 16, SDA_IN pin 20, SCL_IN pin 18, and SCL_OUT pin 22.

Current boost circuitry 70a–d may include, for example, a current source and a slew-rate detector. Current boost circuitry 70a–d may monitor the voltage on the pins (with the slew-rate detector) to determine when a LOW-to-HIGH transition takes place. When a LOW-to-HIGH transition is monitored on one of the pins, current boost circuitry 70a–d may close a switch to provide additional current to that pin.

This additional current may cause the voltage on that pin to rise quicker than if that pin relies solely on VCC and its ability to pull-up the pin with respect its RC time constant. Boost circuitry 70 drives the voltage up much faster because it has a much faster rise rate and a stronger current pull-up than that provided by VCC and its associated RC time constant. Current boost circuitry 70 may close its switch for a predetermined period of time, but preferably, when the voltage on the voltage on the pin ramps up (e.g., from 25% to 75% of VCC). This may minimize additional power consumption drawn by the current source.

FIG. 7 illustrates LOW-to-HIGH waveforms for SDA_OUT and SDA_IN. Moreover, the waveforms show a substantially rapidly increase for a portion of the waveform (e.g., between about 0.6 volts and about 2.0 volts). During this substantially rapid increase, current boost circuitry 70*a–d* may be providing current to decrease the voltage rise time.

In addition, current boost circuitry 70*a–d* may provide the user with the ability to utilize weaker DC pullup currents on the SDA and SCL busses. Using weaker DC pullup currents may reduce power consumption while still meeting system LOW-to-HIGH transition time requirements.

In a further embodiment of the present invention, READY/ACC pin 26 may be configured to enable the ACC portion of the pin instead of the READY portion. Further to this embodiment, when ACC pin 26 is enabled, it may not be coupled to the drain of transistor 95. ACC may be coupled to current boost circuitry 70*a–d* and also be responsive to user inputs. For example, a user may be able to disable current boost circuitry 70*a–d* by applying a low voltage to ACC pin 26.

Referring back to FIG. 1, one advantage of the present invention provides interconnection circuitry 10 with the ability to join at least two busses together while maintaining electrical isolation. Buffer circuitry 84 may, for example, electrically isolate the capacitance CBACK of the backplane from the capacitance CCARD of the I/O card. Since the respective capacitances are isolated, devices on either the backplane or the I/O card may not have to overcome the combined capacitance of CBACK and CCARD to drive a signal from one device to another. Instead, devices on the backplane may only have to overcome CBACK plus the capacitance of the SDA_IN pin 20 when driving a signal to the I/O card. Likewise, devices on the I/O card may only have to overcome CCARD plus the capacitance of SDA_OUT pin 16, when driving a signal to the backplane. Otherwise, if the I/O cards are plugged into the backplane without the present invention, the capacitance of each card and the backplane would be added together. In such a case, the devices connected to the bus may have to drive the total capacitance of CCARD and CBACK, thus slowing down HIGH-to-LOW and LOW-to-HIGH signal transitions.

One application which could take advantage of buffer circuitry 84 of the present invention is a large server system. Typically, large server systems utilize numerous I/O cards (often, each having a large capacitance) that are connected into a backplane. Such a system is illustrated in FIG. 2. The present invention may facilitate rapid transfer of signals between the I/O card and backplane because the respective capacitances are isolated from each other.

In another embodiment of the present invention, ENABLE/VCC2 pin 24 may be configured to use the VCC2 portion of the pin for a second supply voltage. In this embodiment, the VCC2 function is active and the ENABLE function is inactive. When VCC2 is configured for use, it may not be coupled to UVLO/ENABLE circuitry 50. Instead, VCC2 may provide a voltage source to pull up SDA_OUT pin 16 and SCL_OUT pin 18, while SDA_IN pin 20 and SCL_IN pin 22 are pulled up to the first supply voltage VCC. This may provide the user with the ability to supply different pins with voltages from separate voltage sources (e.g., VCC and VCC2). In addition, VCC2 can provide bias current to boost circuitry 70*a–b* of FIG. 1.

Figure 8:
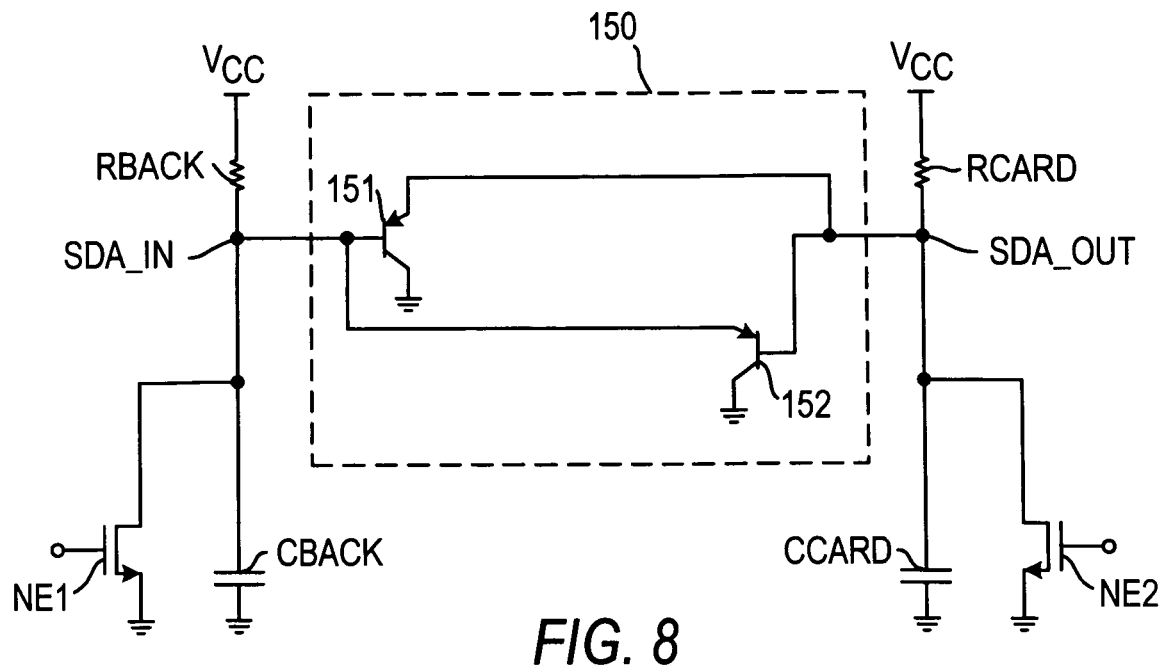
FIG. 8 is a circuit diagram of an alternative embodiment of buffer circuitry according to the principles of the present invention.

Another embodiment of buffer circuitry of the present invention is shown in FIG. 8. In this instance, buffer circuitry 150 may be provided instead of buffer circuitry 100 in place of buffer circuitry 84 and 85 of FIG. 1. Initially, when the I/O card housing buffer circuitry 150 is connected to the backplane, switches 80*a–d* are OPEN. When switches 80*a–d* are OPEN, buffer circuitry 150 may be decoupled from SDA_IN pin 20, SDA_OUT pin 16, SCL_OUT pin 18, and SCL_IN pin 22. As discussed previously with respect to FIG. 1, switches 80*a–d* may close and physically connect the backplane and I/O card busses to buffer circuitry 150. Therefore, buffer circuitry 150 provides for connecting and removing the I/O card data and clock busses to the backplane without having to power down the backplane. Thus, hot swapping may be possible because the data and clock pins are not coupled to their busses until a STOP Bit or Bus IDLE condition is detected.

Buffer circuitry 150 may include cross-coupled PNP bipolar transistors 151 and 152. SDA_IN may be coupled to the base of transistor 151 and to the emitter of transistor 152. The collectors of both transistors 151 and 152 are coupled to ground. SDA_OUT may be coupled to the emitter of transistor 151 and to the base of transistor 152. This particular arrangement may also provide capacitive isolation between SDA_IN and SDA_OUT.

This isolation may buffer the capacitance of SDA_IN from the capacitance of SDA_OUT and vice versa. The capacitive isolation may result in faster signal transition times. For example, devices on the backplane may only have to overcome backplane capacitances such as CBACK plus the capacitance of SDA_IN to transmit a signal to the I/O card. Devices on the I/O card, on the other hand, may only have to overcome I/O card capacitances to drive a signal to the backplane. Buffer circuitry 150 may, therefore, provide circuitry that speeds up signal transition on the busses.

Data transfer between the backplane and the I/O card may occur as follows. Assume initially that external devices NE1 and NE2 and transistors 151 and 152 are OFF. When external devices NE1 and NE2 are OFF, SDA_IN is pulled up to VCC through pull-up resistor RBACK, and SDA_OUT is pulled up to VCC through pull-up resistor RCARD. Transistor 151 may be OFF because its emitter-base voltage is less than its turn ON voltage (e.g., 0.6 volts). When device NE1 turns ON, SDA_IN may be pulled down to about zero volts. As the voltage on SDA_IN is pulled down towards zero, it may reach a voltage level (e.g., VCC −0.6 volts) that results in turning transistor 151 ON. Thus, transistor 151 may turn ON when its emitter-base voltage increases above its turn-ON voltage.

Once ON, transistor 151 may begin to pull the voltage on SDA_OUT down. As transistor 151 pulls down the voltage on SDA_OUT, it may regulate the voltage on SDA_OUT such that it is maintained at a turn-ON voltage drop (e.g., 0.6 volts) higher than SDA_IN voltage. When SDA_IN voltage reaches ground, the voltage at SDA_OUT may be at the turn ON voltage of transistor 151 (e.g., 0.6 volts).

When external device NE1 turns OFF, SDA_IN may be pulled back up to VCC via resistor RBACK. Transistor 151 may cause the voltage at SDA_OUT to remain about 0.6 volts above the voltage at SDA_IN at least until the SDA_OUT voltage reaches VCC. Once SDA_OUT reaches VCC, transistor 151 turns OFF. SDA_IN may continue to increase to VCC.

Likewise when data is transferred from the I/O card to the backplane, external device NE2 may cause transistor 152 to conduct. Transistor 152 may cause the voltage on SDA_IN pin 20 to decrease from VCC on HIGH to LOW transitions. Transistor 152 may also cause SDA_IN pin 20 to increase back to VCC on LOW to HIGH transitions at about 0.6 volts above SDA_OUT, at least until SDA_IN reaches VCC.

Buffer circuitry 150 provides electrical isolation and speedy transition times, but may not be able to drive both busses down to about zero. Instead, buffer circuitry 150 may drive one bus to about zero and another bus to about the turn-ON voltage of that driving transistor (e.g., 0.6 volts). For example, if the I/O card is driving the backplane, transistor 152 may not be able to drive SDA_IN below its turn-ON voltage, which is typically 0.6 volts. This voltage may be too high for some circuitry to interpret correctly as a logic LOW. SMBus and I$^2$C specifications, for example, generally require a voltage of 0.4 volts or less for a logic LOW. The following describes circuitry that provides electrical isolation, speedy transitions, and can drive both buses to about zero volts.

Figure 9:
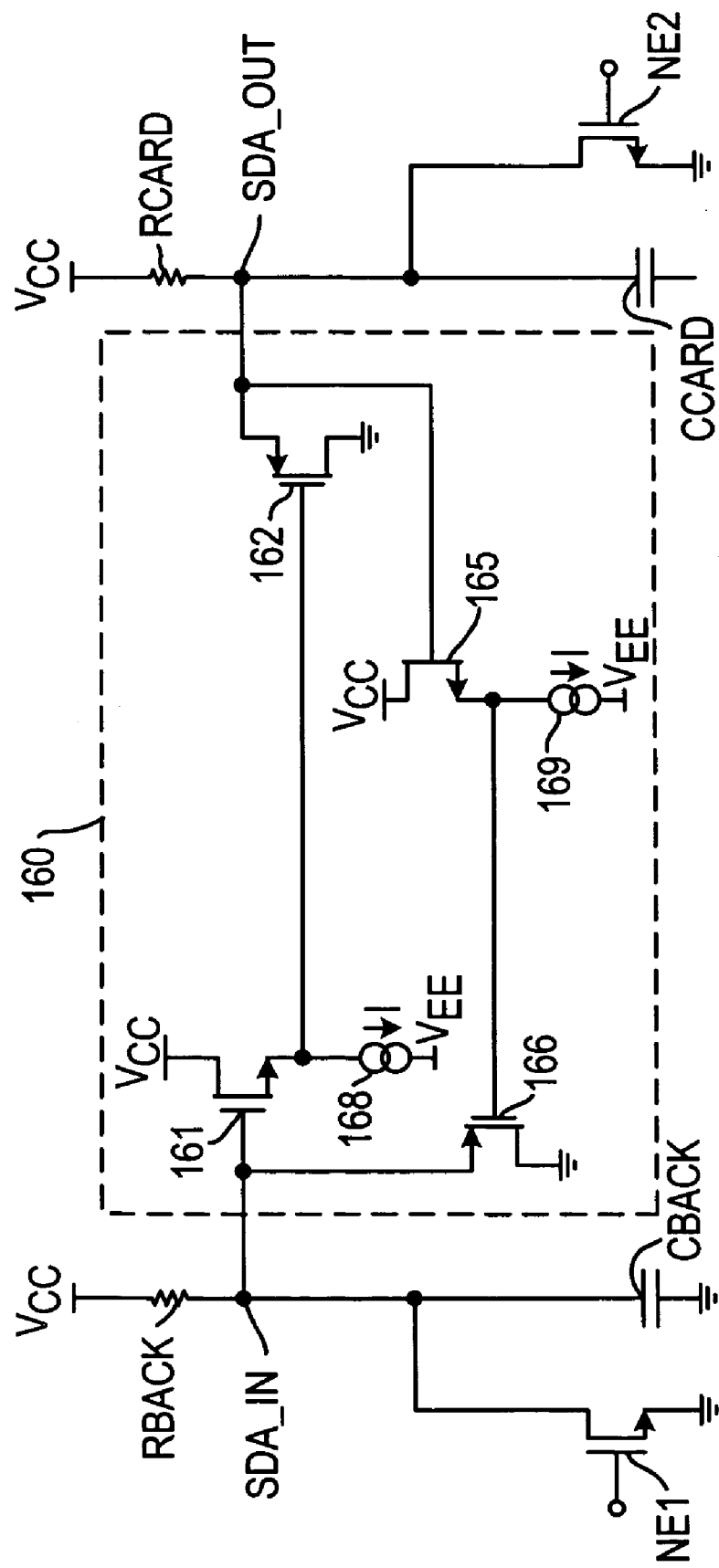
FIG. 9 is a circuit diagram of another alternative embodiment of buffer circuitry according to the principles of the present invention.

FIG. 9 illustrates another example of buffer circuitry constructed in accordance with the present invention. Buffer circuitry 160 may be provided as the buffer circuitry instead of circuit 100, in place of buffer circuitry 84 and 85 shown in FIG. 1. Buffer circuitry 160 may be similarly coupled and decoupled to SDA_IN pin 20, SDA_OUT pin 16, SCL_OUT pin 18, and SCL_IN pin 22 as described in conjunction with FIGS. 1, 3 and 8. Accordingly, buffer circuitry 160 may operate in hot swap conditions, provide electrical isolation, and provide high speed transistions.

Buffer circuitry 160 may include NMOS transistors 161 and 165, PMOS transistors 162 and 166, and constant current sources 168 and 169. SDA_IN may be coupled to the gate of NMOS transistor 161 and the source of PMOS transistor 166. The drains of NMOS transistors 161 and 165 may be coupled to VCC. The sources of NMOS transistors 161 and 165 may be coupled to constant current sources 168 and 169, respectively. The sources of NMOS transistors 161 and 165 may also be coupled to the gates of PMOS transistors 162 and 166, respectively. Current sources 168 and 169 may also be coupled to VEE. Preferably, current sources 168 and 169 provide a constant current flowing to the negative voltage source VEE (e.g., about −1 volt). Finally, SDA_OUT may be coupled to the source of PMOS transistor 162 and to the gate of NMOS transistor 165.

As shown in FIG. 9, transistors 161 and 162 are paired together and transistors 165 and 166 are also paired together. The first pair (e.g., transistors 161 and 162) may be cross-coupled with the second pair (e.g., transistors 165 and 166). This cross-coupling may provide electrical isolation between the backplane and the I/O card.

Before data transfer between the backplane and the I/O card is discussed, the operating relationship of transistors 161, 162, 165, and 166, and current sources 168 and 169 is described. Current sources 168 and 169 may provide assistance in turning transistors 162 and 166 ON and OFF. For example, when VCC pulls SDA_IN up, the current through transistor 161 may increase accordingly. As the current increases, it may become greater than the current provided by current source 168. Once this occurs, the voltage at the source of transistor 161 may be pulled HIGH. A HIGH source voltage on transistor 161 may cause transistor 162 to be turned OFF. On the other hand, when the voltage on SDA_IN decreases, the current passing through transistor 161 also decreases. When the current passing through transistor 161 decreases below that provided by current source 168, the voltage on the source may be pulled LOW. A LOW source voltage may cause transistor 162 to turn ON. Hence, the level of the current passing through transistor 161 may provide a HIGH or LOW source voltage depending upon its relation to the current provided by constant current source 168.

This relationship among current sources 168 and 169 and transistors 161, 162, 165, 166 may provide buffer circuitry 160 with the ability to fully drive both busses to about zero volts. Buffer circuitry 160 may be able to drive both busses to about zero volts because the threshold voltages (e.g., 0.7 volts) of the transistors cancel each other out. In particular, when signals are driven from the backplane to the I/O card, the threshold voltages of transistors 161 and 162 may cancel each other out. Similarly, the threshold voltages of transistors 165 and 166 may also cancel each other out.

Data transfer in buffer circuitry 160 may occur as follows. Assume initially that external devices NE1 and NE2 are OFF. This may cause the voltage on SDA_IN and SDA_OUT to be pulled HIGH by VCC. HIGH voltages on SDA_IN and SDA_OUT may cause transistors 161 and 165 to be turned ON. If transistors 161 and 165 are ON, then transistors 162 and 166 are turned OFF.

Further assume that the backplane is going to drive a signal to I/O card. When external device NE1 turns ON, the voltage at SDA_IN and the gate of transistor 161 may be pulled to ground. As the SDA_IN voltage is pulled down to ground, the source voltage of transistor 161 may remain at about one threshold voltage drop below the SDA_IN voltage. Since the source voltage of transistor 161 is falling in conjunction with SDA_IN, the voltage applied to the gate of transistor 162 is also pulled down. As the voltage applied to the gate of transistor 162 decreases, transistor 162 conducts more current and pulls the SDA_OUT voltage down. SDA_OUT may remain at about a threshold voltage drop above the gate of transistor 162 as SDA_OUT is pulled to ground. When the SDA_IN voltage reaches ground, the SDA_OUT voltage may also be at ground because the threshold voltages of transistors 161 and 162 cancel each other.

When external device NE1 turns OFF and external device NE2 is still OFF, the voltage on SDA_IN may be pulled to VCC through resistor RBACK. The source voltage of transistor 161 may remain at a threshold voltage below its gate, and the source of transistor 162 remains at a threshold voltage above its gate as the SDA_IN voltage is pulled to VCC. When the SDA_IN voltage reaches VCC, the SDA_OUT voltage may also be at VCC. Thus, the voltage at SDA_OUT advantageously swings all the way from VCC to ground and back to VCC again. In the same manner, current source 169 and transistors 165 and 166 operate as their above-described counterparts when data is transferred from the card bus to the backplane bus.

Figure 10:
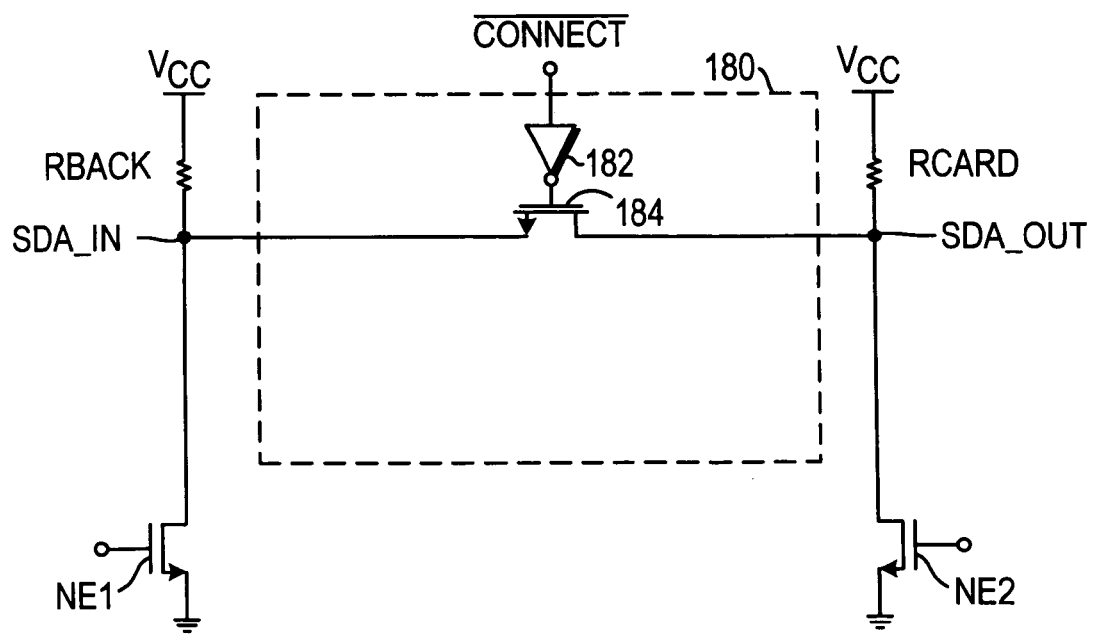
FIG. 10 is a circuit diagram of yet another alternative embodiment of buffer circuitry according to the principles of the present invention.

Another example of buffer circuitry constructed in accordance with the present invention is shown in FIG. 10. Buffer circuitry 180 may be used in place of buffer circuitry 84 shown and used in conjunction with FIG. 1. Buffer circuitry 180 may include inverter 182 and transistor 184. Inverter 182 may be coupled to receive signal CONNECT BAR (of FIG. 1) and to transistor 184.

Buffer circuitry 180 may operate in conjunction with the CONNECT BAR signal, which is set HIGH or LOW by STOP/IDLE circuitry 30 of FIG. 1. When CONNECT BAR goes LOW, the output of inverter 132 goes HIGH and turns ON transistor 184. Once transistor 184 is turned ON, SDA_IN pin 20 may be coupled to SDA_OUT pin 16. Therefore, buffer circuitry 180 may provide the ability to connect and remove the I/O card data and clock busses to the backplane without having to power down the backplane. This may be because the data and clock busses are not coupled until a STOP Bit or Bus IDLE condition is detected (as indicated by the CONNECT BAR signal going LOW). However, buffer circuitry 180 may not provide electrical isolation for SDA_OUT and SDA_IN (or between SCL_OUT and SCL_IN).

Figure 11:
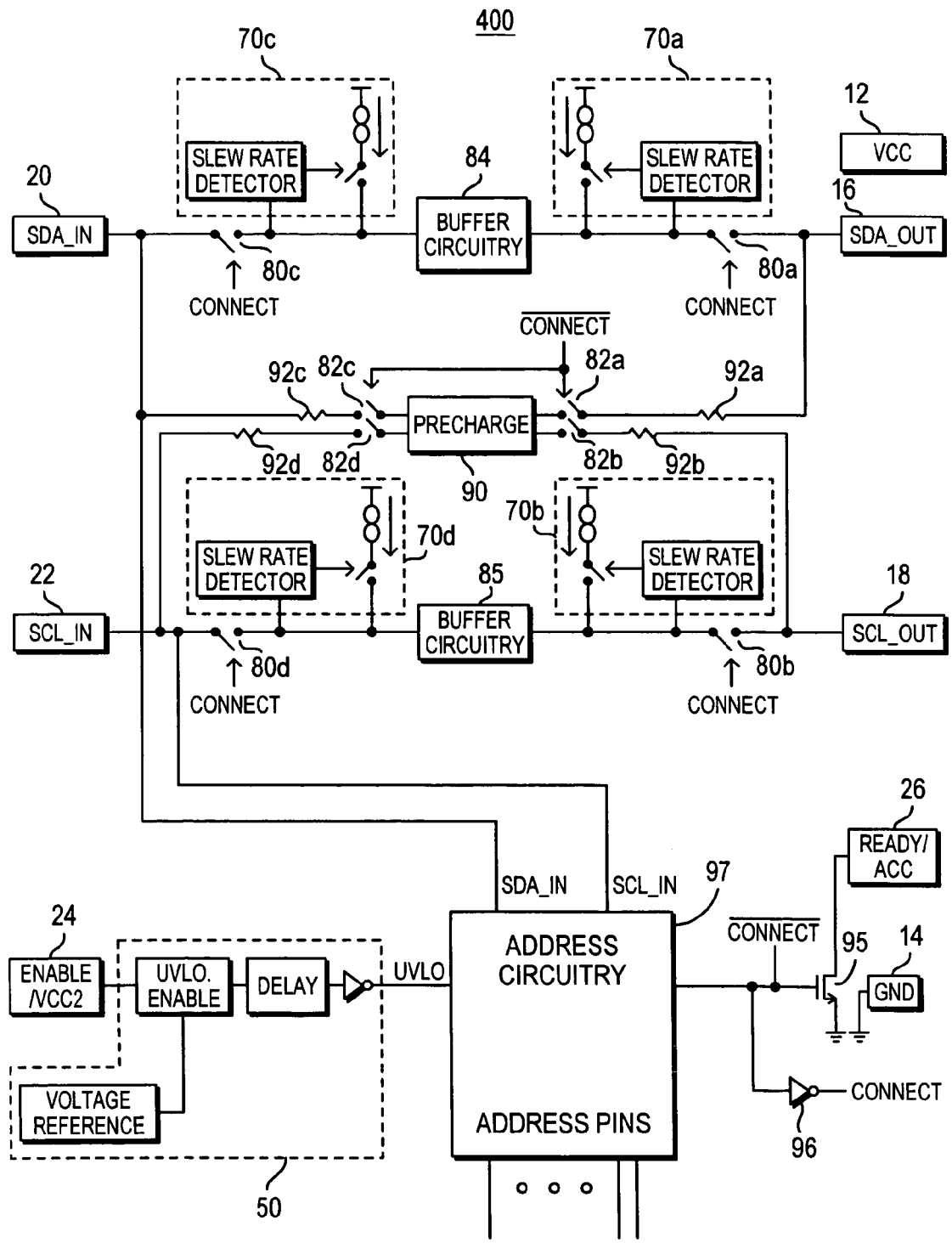
FIG. 11 is a pin out block diagram of alternative interconnection circuitry according to the principles of the present invention.

FIG. 11 shows a block diagram that illustrates addressing circuitry operating in conjunction with interconnection circuitry for "hot-swapping" data and clock busses in accordance with the principles of the present invention. FIG. 11 shows interconnection circuitry 400, which embodies many of the features of interconnection circuitry 10 of FIG. 1. Therefore, any features of FIG. 1 that are shown in FIG. 11 may incorporate and embody the operating characteristics of such features for the following description. In addition, FIG. 11 also includes address circuitry 97, which is coupled to receive SDA_IN, SCL_IN, a plurality of address pins, and the output of UVLO/ENABLE circuitry 50. Some of the address pins may be connected to either VCC or GROUND, or may be internally hard-wired within address circuitry 97 to set the digital address for interconnection circuitry 400. For example, if there are seven pins total, three may be wired internally and the other four pins may be connected external to address circuitry 97. Address circuitry 97 has an output, labeled as CONNECT BAR, which is coupled to transistor 95. The input of inverter 96 is coupled to the output of address circuitry 97, and provides the output signal CONNECT. As described above in FIG. 1, the states (e.g., logic HIGH or LOW) of CONNECT BAR and CONNECT determine whether switches 80*a*–*d* and switches 82*a*–*d* are OPEN or CLOSED.

In this embodiment, interconnection circuitry 400 is not independently capable of determining when to close switches 80*a*–*d*. Instead, interconnection circuitry 400 is dependent on a signal provided by a system backplane to determine when it is suitable to couple the backplane bus to the I/O card busses with interconnection circuitry 400. The system backplane may indicate that it is suitable to interconnect the bus by addressing the interconnection circuitry via the backplane data bus. (Interconnection circuitry 400 is addressed when the serial data signal transmitted over the backplane data bus matches the digital address assigned to interconnection circuitry 400. Typically, the data signals are transmitted in conjunction with clock signals provided by the backplane clock bus. Address circuitry 97 may use decoder circuitry to perform such a task in addition to reading other data provided by the backplane data bus.) When the backplane addresses interconnection circuitry 400, an additional signal may be sent to force the output of address circuitry 97 to go LOW. This LOW signal causes switches 82*a*–*d* to OPEN and causes switches 80*a*–*d* to CLOSE. However, before this LOW signal is applied, address circuitry 97 may wait for a STOP bit before causing switches 80*a*–*d* to CLOSE.

It should be noted that prior to receiving the command to couple the backplane and I/O card busses, CONNECT BAR is HIGH. That is, switches 82*a*–*d* are CLOSED and switches 80*a*–*d* are OPEN. Moreover, if UVLO/ENABLE circuitry 50 detects that the interconnection circuitry supply voltage is below a predetermined value, it may force address circuitry to provide a HIGH output signal and ignore the backplane data and clock signals.

Once interconnection circuitry 400 is addressed, and a signal is transmitted to CLOSE switches 80*a*–*d*, the I/O card busses are interconnected to the backplane bus by buffer circuitry 84 and 85. Furthermore, once interconnection circuitry 400 is addressed and commanded to interconnect, CONNECT BAR remains LOW until either (1) the interconnection circuitry supply voltage drops below a predetermined level and causes the circuit to enter UVLO or (2) interconnection circuitry 400 is addressed again and instructed to disconnect the backplane form the card.

While the present embodiment is described having the backplane address interconnection circuitry 400, persons skilled in the art will appreciate that the present embodiment can be constructed such that the I/O card can address interconnection circuitry 400, and thus cause the backplane and I/O card busses to connect or disconnect.

Thus it is seen that the various embodiments of the present invention provide different combinations of hot-swap capability of data and clock busses, and buffer circuitry that may provide capacitive isolation between the backplane and I/O card. Persons skilled in the art will appreciate that the present invention can be practiced by other than the described embodiments, which are presented for purposes of illustration rather than of limitation, and the present invention is limited only by the claims which follow.

What is claimed is:

1. A method for interconnecting a live backplane having a data bus and a clock bus to at least a first two-wire I/O card having a data bus and a clock bus using interconnection circuitry, said method comprising:

monitoring said backplane data bus and said backplane clock bus to determine a first condition indicative of whether said backplane may be interconnected with said first I/O card;

monitoring said I/O card data bus and said I/O card clock bus to determine a second condition indicative of whether said first I/O card may be interconnected with said backplane; and interconnecting said backplane with said first I/O card when said first and second conditions have been met.

2. The method of claim 1, wherein said first condition occurs when said backplane data bus exhibits a signal that transitions from LOW-to-HIGH while said backplane clock bus is exhibiting a HIGH signal.

3. The method of claim 1, wherein said first condition occurs when said backplane data bus and said backplane clock bus both exhibit HIGH signals for a predetermined period of time.

4. The method of claim 1, wherein said second condition occurs when said first I/O card data bus and said first I/O card clock bus exhibit HIGH signals.

5. The method of claim 1 further comprising:

prior to having met said first and second conditions, charging said backplane busses and said first I/O card busses to a predetermined voltage level; and ceasing said charging when said first and second conditions are met.

6. The method of claim 1 further comprising:

preventing said monitoring of said backplane busses and said first I/O card busses when said interconnection circuitry has a supply voltage level below a predetermined voltage level.

7. The method of claim 1, wherein said interconnecting comprises closing a first plurality of switches to interconnect said backplane data bus to said first I/O card data bus and to interconnect said backplane clock bus to said first I/O card clock bus.

8. The method of claim 1, wherein said interconnecting comprises providing bias current to a plurality of amplifiers to interconnect said backplane data bus to first I/O card data bus and to interconnect said backplane clock bus to said first I/O card clock bus.

9. The method of claim 1 further comprising:
after said interconnecting occurs, disconnecting said backplane from said first I/O card when said interconnection circuitry has a supply voltage level that falls below a predetermined voltage level; and
preventing said monitoring of said backplane busses and said first I/O card busses until said supply voltage level rises above said predetermined voltage level.

10. An interconnection circuit that connects a live backplane having a backplane data bus and a backplane clock bus to at least a first two-wire I/O card having a first I/O card data bus and a first I/O card clock bus, said circuit comprising:
buffer circuitry coupled between said backplane data bus and said first I/O card data bus, and coupled between said backplane clock bus and said first I/O card clock bus; and
monitoring circuitry that monitors said backplane data and clock busses for a first condition, and said I/O card data and clock busses for a second condition, and causing said buffer circuitry to couple said backplane and I/O card data busses together and to couple said backplane and I/O card clock busses together when said first and second conditions are met.

11. The circuit of claim 10 further comprising:
under voltage lockout circuitry that prevents said monitoring circuitry from monitoring said backplane busses and said first I/O card busses when an interconnection circuit supply voltage level is below a predetermined voltage level.

12. The circuit of claim 10 further comprising:
a first plurality of switches coupled to said buffer circuitry and configured to OPEN and CLOSE said switches based on a signal provided by said monitoring circuitry, said switches, when CLOSED, cause said backplane and I/O card busses to couple to said buffer circuitry.

13. The circuit of claim 10 further comprising:
precharge circuitry that is coupled between said backplane busses and said first I/O card busses; and
a second plurality of switches coupled to said precharge circuitry, said second switches, when CLOSED, cause said precharge circuitry to apply a predetermined voltage to said backplane busses and to said first I/O card busses.

14. The circuit of claim 10, wherein said first condition occurs when said backplane data bus exhibits a signal that transitions from LOW-to-HIGH while said backplane clock bus is exhibiting a HIGH signal.

15. The method of claim 10, wherein said first condition occurs when said backplane data bus and said backplane clock bus both exhibit HIGH signals for a predetermined period of time.

16. The method of claim 10, wherein said second condition occurs when said first I/O card data bus and said first I/O card clock bus exhibit HIGH signals.

17. The circuit of claim 10, wherein said buffer circuitry comprises:
cross-coupled circuitry that isolates the capacitance associated with the backplane busses from the capacitance associated with the first I/O card busses.

18. The circuit of claim 11, wherein said under voltage lockout circuitry is configured to cause said monitoring circuitry to disconnect said backplane busses from said first I/O card busses when said interconnection circuit supply voltage level falls below a second predetermined voltage level.

19. The circuit of claim 13, wherein said monitoring circuitry causes said second switches to OPEN and remain OPEN when said first and second conditions are met.

20. The circuit of claim 13, wherein said monitoring circuitry causes second switches to be CLOSED until both said first and second conditions are met.

21. The circuit of claim 17, wherein said cross-coupled circuitry drives a signal between said backplane data bus and said first I/O card data bus.

22. The circuit of claim 17, wherein said cross-coupled circuitry drives a signal between said backplane clock bus and said first I/O card clock bus.

23. A method for driving at least one signal between a backplane bus and at least a first I/O card bus, said method comprising:
isolating the capacitance associated with said backplane bus from the capacitance associated with said first I/O card bus;
driving said at least one signal from said backplane bus to said first I/O card bus at a level that need only overcome said backplane capacitance; and
driving said at least one signal from said first I/O card bus to said backplane bus at a level that need only overcome said first I/O card capacitance.

24. The method of claim 23 further comprising:
maintaining a predetermined differential voltage level between a backplane bus voltage level and a first I/O card bus voltage level when said signal is driven from said backplane bus to said first I/O card bus.

25. The method of claim 23 further comprising:
maintaining a predetermined differential voltage level between a backplane bus voltage level and a first I/O card bus voltage level when said signal is driven from said first I/O card bus to said backplane bus.

26. The method of claim 23, wherein said isolating comprises providing high-speed signal propagation between said backplane bus and said first I/O card bus.

27. The method of claim 23, wherein said isolating comprises isolating the capacitance associated with said first I/O card bus from the capacitance associated with at least a second I/O card bus.

28. The method of claim 23, wherein said isolating comprises isolating the capacitance associated with at least a second I/O card bus from the capacitance associated with said backplane bus.

29. The method of claim 23 further comprising:
disabling said driving of said at least one signal from said backplane bus to said first I/O card bus when said at least one signal is transitioning from LOW-to-HIGH.

30. The method of claim 23 further comprising:
disabling said driving of said at least one signal from said first I/O card bus to said backplane bus when said at least one signal is transitioning from LOW-to-HIGH.

31. The method of claim 23 further comprising:
providing current to said backplane bus and said first I/O card bus when said at least one signal is transitioning from LOW-to-HIGH.

32. The method of claim 23 further comprising:
when voltages on said backplane bus and said first I/O card bus are rising, regulating the voltage on either said backplane bus and said first I/O card bus when the voltage differential of the two busses exceeds a predetermined differential voltage level such that the voltages on both said backplane bus and said first I/O card bus rise at a substantially similar rate.

33. An interconnection circuit that drives at least one signal between a backplane bus and at least a first I/O card bus, said circuit comprising:
backplane driving circuitry configured to isolate the capacitance associated with said backplane bus from the capacitance associated with said first I/O card bus, and to drive said signal from said backplane bus to said first I/O card bus at a level that need only overcome said backplane capacitance; and
first I/O card driving circuitry configured to isolate the capacitance associated with said first I/O card bus from the capacitance associated with said backplane bus, and to drive said signal from said first I/O card bus to said backplane bus at a level that need only overcome said first I/O card capacitance.

34. The circuit of claim 33, wherein said backplane driving circuitry comprises:
a backplane amplifier coupled to said backplane bus;
a backplane transistor coupled to said first I/O card bus and said backplane amplifier, said backplane amplifier configured to drive said backplane transistor in response to a signal on said backplane bus; and
a backplane voltage source coupled between said backplane amplifier and said first I/O card bus.

35. The circuit of claim 33, wherein said first I/O card driving circuitry comprises:
an I/O card amplifier coupled to said first I/O card bus;
an I/O card transistor coupled to said backplane bus and to said I/O card amplifier, said I/O card amplifier configured to drive said first I/O card transistor in response to a signal on said first I/O card bus; and
an I/O card voltage source coupled between said I/O card amplifier and said backplane bus.

36. The circuit of claim 33, wherein said backplane driving circuitry and said first I/O card driving circuitry are interconnected in a cross-coupled configuration.

37. The circuit of claim 33, wherein said backplane driving circuitry is a transistor.

38. The circuit of claim 33, wherein said first I/O card driving circuitry is a transistor.

39. The circuit of claim 33, wherein said backplane driving circuitry comprises
a first plurality of transistors coupled together and configured to drive said signal from said backplane bus to said first I/O card bus.

40. The circuit of claim 33, wherein said first I/O card driving circuitry comprises:
a second plurality of transistors coupled together and configured to drive said signal from said first I/O card bus to said backplane bus.

41. The circuit of claim 33 further comprising:
current boost circuitry configured to provide current to said backplane bus and to said first I/O card bus when said at least one signal is transitioning from LOW-to-HIGH.

42. The circuit of claim 33 further comprising:
control circuitry that disables said backplane driving circuitry and said first I/O card driving circuitry when said at least one signal is transitioning from LOW-to-HIGH.

43. The circuit of claim 34, wherein said backplane driving circuitry is configured to drive said at least one signal such that a backplane bus voltage level and a first I/O card bus voltage level differ at most by a predetermined voltage level set by said backplane voltage source.

44. The circuit of claim 34, wherein said backplane voltage source prevents said backplane driving circuitry from driving said at least one signal when said first I/O card driving circuitry is driving said at least one signal.

45. The circuit of claim 35, wherein said first I/O card driving circuitry is configured to drive said at least one signal such that a first I/O card bus voltage level and a backplane bus voltage level differ at most by a predetermined voltage level set by said I/O card voltage source.

46. The circuit of claim 35, wherein said first I/O card voltage source prevents said first I/O card driving circuitry from driving said at least one signal when said backplane driving circuitry is driving said at least one signal.

47. The circuit of claim 39 further comprising:
a backplane current source coupled to at least one of said first plurality of transistors and configured to assist in driving said signal from said backplane bus to said first I/O card bus.

48. The circuit of claim 40 further comprising:
a first I/O card current source coupled to at least one of said second plurality of transistors and configured to assist in driving said signal from said first I/O card bus to said backplane bus.

49. An interconnection circuit that connects a live backplane having a backplane data bus and backplane clock bus to at least a first I/O card having a first I/O card data bus and a first I/O card clock bus, said circuit comprising:
buffer circuitry coupled between said backplane data bus and said I/O card data bus, and coupled between said backplane clock bus and said I/O card clock bus, wherein said buffer circuitry comprises cross-coupled circuitry that isolates the capacitance associated with the backplane busses from the capacitance associated with the first I/O card busses;
interconnection circuitry operative to selectively couple said backplane data and clock busses and said I/O card data and clock busses to said buffer circuitry; and
address circuitry that causes said interconnection circuitry to couple said backplane data and clock busses and said I/O card data and clock busses to said buffer circuitry when said address circuitry receives a predetermined signal.

50. The circuit of claim 49, wherein said address circuitry comprises:
a plurality of address pins that, when connected, determine a digital address for said interconnection circuit.

51. The circuit of claim 49, wherein said address circuitry comprises:
a decoder that decodes data signals provided by said backplane data bus.

52. The circuit of claim 49, wherein said cross-coupled circuitry is first cross-coupled circuitry, which drives a signal between said backplane data bus and said first I/O card data bus.

53. The circuit of claim 49, wherein said cross-coupled circuitry is second cross-coupled circuitry, which drives a signal between said backplane clock bus and said first I/O card clock bus.

* * * * *

UNITED STATES PATENT AND TRADEMARK OFFICE
CERTIFICATE OF CORRECTION

| | |
|---|---|
| PATENT NO. | : 7,032,051 B2 |
| APPLICATION NO. | : 10/013893 |
| DATED | : April 18, 2006 |
| INVENTOR(S) | : Robert L. Reay and John H. Ziegler |

It is certified that error appears in the above-identified patent and that said Letters Patent is hereby corrected as shown below:

Title Page, in field (54), change in both instances of "CAPACITANES" to --CAPACITANCES--.

Title Page, in field (56), Foreign Patent Documents, citation DE 3804074, change "8/1989" to --4/1990--.

Page 2, in field (56), Foreign Patent Documents, citation EP 0 402 367 change "12/1990" to --5/1993--.

Column 1, line 6, change "CAPACITANES" to --CAPACITANCES--.

Column 1, line 7, change "CAPACITANES" to --CAPACITANCES--.

Column 4, line 41, delete the first occurrence of "the".

Column 4, line 45, change "al" to --all--.

Column 6, line 36, change "based the" to --based on the --.

Column 7, line 5, change ";" to --,--.

Column 8, line 9, change "REACK" to --RBACK--.

Column 9, line 26, change "an" to --and--.

Column 9, line 46, change "respectively however" to --respectively.  However--.

Column 9, line 65, delete "they".

Column 9, line 67, change "as" to --at--.

Column 12, line 19, change "S" to --S1--.

Column 12, line 23 change "conduct to" to --conduct they--.

Column 13, line 3, insert --to--after "respect".

Column 13, line 14, change "rapidly" to --rapid--.

Column 13, line 66, insert space between "VCC2" and "is".

UNITED STATES PATENT AND TRADEMARK OFFICE
CERTIFICATE OF CORRECTION

PATENT NO. : 7,032,051 B2
APPLICATION NO. : 10/013893
DATED : April 18, 2006
INVENTOR(S) : Robert L. Reay and John H. Ziegler It is certified that error appears in the above-identified patent and that said Letters Patent is hereby corrected as shown below:

Column 15, line 34, change "transistions" to --transitions--.

Column 18, line 10, change "form" to --from--

Signed and Sealed this

Tenth Day of April, 2007

JON W. DUDAS
*Director of the United States Patent and Trademark Office*